(12) United States Patent
Tokura

(10) Patent No.: US 9,656,355 B2
(45) Date of Patent: May 23, 2017

(54) MANUFACTURING METHOD FOR GRIP MEMBER FOR INSERTION TUBE IN HEAT EXCHANGER, MANUFACTURING METHOD FOR HEAT EXCHANGER USING SAID GRIP MEMBER, AND AIR CONDITIONER AND/OR OUTDOOR UNIT HAVING SAID HEAT EXCHANGER

(75) Inventor: Kenji Tokura, Osaka (JP)

(73) Assignee: KYOSHIN KOGYO CO., LTD., Osaka (JP)

( * ) Notice: Subject to any disclaimer, the term of this patent is extended or adjusted under 35 U.S.C. 154(b) by 481 days.

(21) Appl. No.: 14/233,722

(22) PCT Filed: Jul. 20, 2012

(86) PCT No.: PCT/JP2012/069264
§ 371 (c)(1),
(2), (4) Date: Jan. 17, 2014

(87) PCT Pub. No.: WO2013/012100
PCT Pub. Date: Jan. 24, 2013

(65) Prior Publication Data
US 2014/0124184 A1    May 8, 2014

(30) Foreign Application Priority Data

Jul. 20, 2011  (JP) .................................. 2011-173397
Jul. 17, 2012  (JP) .................................. 2012-173372

(51) Int. Cl.
*B21D 41/00*    (2006.01)
*B23P 15/26*    (2006.01)
(Continued)

(52) U.S. Cl.
CPC ............ *B23P 15/26* (2013.01); *B21D 41/028* (2013.01); *B21D 53/08* (2013.01); *F28F 1/30* (2013.01);
(Continued)

(58) Field of Classification Search
CPC ..... B23P 15/26; F28F 1/30; F28F 1/32; F28F 2255/00; B21D 53/08; B21D 41/028; Y10T 29/49378; F28D 1/0475
See application file for complete search history.

(56) References Cited

U.S. PATENT DOCUMENTS

| | | | |
|---|---|---|---|
| 5,806,173 A * | 9/1998 | Honma ................... | B21D 39/20 29/726 |
| 5,815,913 A * | 10/1998 | Tokura ................. | B21D 53/085 29/727 |
| 5,853,507 A * | 12/1998 | Ali .......................... | B23P 15/26 148/519 |

FOREIGN PATENT DOCUMENTS

| | | |
|---|---|---|
| JP | 54-140586 U | 9/1979 |
| JP | 63-188433 A | 8/1988 |

(Continued)

*Primary Examiner* — Sarang Afzali
*Assistant Examiner* — Ruth G Hidalgo-Hernandez
(74) *Attorney, Agent, or Firm* — Konomi Takeshita

(57) ABSTRACT

The invention provides a tube-grasping body for grasping an insert tube in a heat exchanger, and heat exchanger production methods and apparatuses utilizing the tube-grasping body, wherein the tube-grasping body enables enlarging and connecting an insert tube to a heat radiating fin for producing a heat exchanger, while still keeping the total length of insert tubes at an almost same level even after the enlargement; and the tube-grasping body is connected at its exterior to a guide-pipe.

4 Claims, 12 Drawing Sheets

(51) Int. Cl.
   *B21D 41/02* (2006.01)
   *B21D 53/08* (2006.01)
   *F28F 1/32* (2006.01)
   *F28F 1/30* (2006.01)
   *F28D 1/047* (2006.01)

(52) U.S. Cl.
   CPC .............. *F28F 1/32* (2013.01); *F28D 1/0475* (2013.01); *F28F 2255/00* (2013.01); *Y10T 29/49378* (2015.01)

(56) References Cited

FOREIGN PATENT DOCUMENTS

| | | | |
|---|---|---|---|
| JP | 09-099334 A | | 4/1997 |
| JP | 10-085878 A | | 4/1998 |
| JP | 2000-301271 A | | 10/2000 |
| JP | 2000301271 A | * | 10/2000 |
| JP | 2009-099334 A | | 5/2009 |
| JP | 2010-85878 A | | 4/2010 |
| WO | 2011-087158 A2 | | 7/2011 |

* cited by examiner (b)

MANUFACTURING METHOD FOR GRIP MEMBER FOR INSERTION TUBE IN HEAT EXCHANGER, MANUFACTURING METHOD FOR HEAT EXCHANGER USING SAID GRIP MEMBER, AND AIR CONDITIONER AND/OR OUTDOOR UNIT HAVING SAID HEAT EXCHANGER

CROSS REFERENCE TO RELATED APPLICATIONS

This application claims priority under 35 U.S.C. 119 and 35 U.S.C. 365 based upon Japanese Patent Application No. 2011-173397, filed on Jul. 20, 2011 and upon Japanese Patent Application No. 2012-173372, filed on Jul. 17, 2012. The entire disclosure of the aforesaid application are incorporated herein by reference.

FIELD OF THE INVENTION

The current invention relates to a production method of the tube-grasping body for grasping an insert tube in a heat exchanger, and heat exchanger production methods and apparatuses utilizing the tube-grasping body, and an air conditioner and/or an outdoor unit equipped with the heat exchanger produced by the methods and apparatuses; wherein the tube-grasping body enables the insert tube to be enlarged to connect to a heat radiating fin for producing a heat exchanger, still keeping the total length of insert tubes at an almost same level comparing, even after the insert tube is enlarged by inserting into each of through holes of heat radiating fins in heat exchangers overlaid in their multitudes; and said tube-grasping body prevents the opening of the tube and the end-line of each of the tube-contacting parts of the tube-grasping body, from being deformed or damaged by collision between them, and also firmly grasps the opening side of insert tubes sitting at the interior side in the heat exchanger, as well as the tubes sitting at the exterior side in the heat exchanger, in order to resolve all the problems occurring in the following example cases: the case where the gap between insert tubes is decreased to enable them to be inserted into a heat radiating fin in multiple columns such as columns of 3, 4, or etc., the case where the diameters of insert tubes being enlarged are different according to the spec of the heat exchanger, the case where the gap between each of straight tubes or hairpin tubes being inserted into said heat radiating fin is significantly decreased comparing to the prior arts, the case where the exterior diameter of the insert tube becomes about the same size as the interior diameter of the tube-grasping body itself or the interior diameter between the tube-contacting parts (the interior diameter between the bumps if bumps are formed on the interior surface of the tube-contacting parts), and the case where the axis of said enlargement portion is away, by some degree, relative to the direction of the longitudinal length of the tube-enlarging mandrel, from the axis of the tube-grasping body.

BACKGROUND OF THE INVENTION

For example, the Japanese patent No. 63-188433 (hereinafter referred to as 'the Invention A') and No. 10-85878 (applied by the applicant of the current patent application, and hereinafter referred to as 'the Invention B') are examples of the prior arts, which keep the entire length of insert tubes being enlarged, at an almost same level, even after the enlargement.

That is, as shown in FIG. 12(a), as a method of fixing a hairpin tube 7 at a heat radiating fin by inserting a tube-enlarging mandrel 2 into the opening 7b of said hairpin tube 7 in a heat exchanger 5, in a configuration where multiple hairpin tubes 7 are inserted into multiple heat radiating fins 6 which are overlaid and separated by a prescribed space isolation, 'the Invention A' provides a method wherein the hairpin part 7c of said hairpin tube 7 is fixed by a hook body 10 which is not movable toward said opening 7b;

then the tube 7 is enlarged at the side of the opening 7b, rather than the side of the heat radiating fin 6, by inserting the tube-enlarging mandrel 2 from the opening 7b of the tube 7, and then the enlargement portion 7d is fixed in the through hole 9 of the clamp 8 which is not movable toward the said hairpin part 7c;

then, the tube-enlarging mandrel 2 is inserted into the hairpin tube 7, in the state where the hairpin tube 7 is fixed by the clamp not to move toward the hairpin part 7 and the hairpin tube 7 is fixed by the hook body 10 not to move toward the opening 7b.

According to the method above, after the side of the opening 7b of the hairpin tube 7, rather than the side of the heat radiating fin 6, is fixed in the through hole 9 of the clamp 8 at the side of the opening 7b not to move toward the hairpin part 7c, the hairpin tube 7 tends to shrink during the enlargement process of inserting the tube-enlarging mandrel 2. However, since the hairpin part 7c is also fixed by the hook body 10, shrinkage of the hairpin tube 7 is prevented and absorbed by reducing the thickness in the hairpin tube 7. As a result, shrinkage in the entire length of tubes is kept at a minimum even after the enlargement.

However, the heat exchanger production method explained above has problems as detailed below.

That is, in the method above, as shown in FIG. 12(b), since the opening 7b of the hairpin tube 7 is fixed in the through hole 9 of the clamp 8, if hairpin tubes are inserted in a zigzag pattern in multiple columns such as columns of 3, 4, or etc., there exists a problem that hairpin tubes 7 sitting at the interior side in the heat exchanger cannot be fixed by the clamp 8.

On the other hand, as shown in (c) in the same figure, the problem above can be resolved, by mechanically varying the diameter of the through hole 9 of the clamp 8, by an aperture-like tool operating like an aperture in a camera. However, if the space between each of hairpin tubes 7 is fully taken up with complex components, or if said space is smaller than the gap between said aperture-like tools, there exists a space problem for setting up said aperture-like tools, and thus the limiting factor stated above still develops.

Also, if the diameter of the hairpin tube being enlarged in the heat exchanger 5 is changed according to the spec of the heat exchanger 5, the through holes 9 of the clamp 8 can no longer firmly fix the side of the opening 7b of the hairpin tube 7. Also, other various similar problems develop.

Thus, to resolve all of the problems stated above, the applicant of this application applied 'the Invention B' for the patent registration. According to 'the invention B', as shown in FIG. 1, in a heat exchanger production apparatus 1 configured with the main body 1a installed on the base platform 1b, 1c is the component-loading platform of the heat exchanger 5, which is vertically installed on said base platform 1b. Inside said heat exchanger 5, a plurality of hairpin tubes 7 with prescribed lengths are inserted in a row (not shown in the figure) into multiple heat radiating fins 6 along the surface of the component-loading platform 1c. Also, above said component-loading platform 1c, a pressing-plate 11 is installed to elevate in order to press and fix said heat exchanger 5 between the component-loading platform 1c and the pressing-plate 11.

2 represents the tube-enlarging mandrel which is installed for moving back and forth on said main body 1a, keeping its horizontal status. As shown in FIGS. 2(*a*) and (*b*), the tube-enlarging mandrel 2 is connected from its exterior to the tube-grasping body 3 to enable to move the tube-grasping body along the tube-enlarging mandrel 2. Said tube-grasping body 3 is equipped with a plurality of tube-contacting parts 3f on which the slopes 3b are formed and slanted in the widening direction, toward the side of the opening 7b of the corresponding tube 7, and which are capable of radially expanding or axially compressing (the arrow E) in the cross direction of the longitudinal length of said hairpin tube 7. Said slope 3b is formed to reach the end-line 3o of the tube-contacting part 3f. Said tube-grasping body 3 is screwed and connected to the tube-grasping body holder 3l by the bolt 3k formed at the other side, the opposite side of said tube-contacting parts 3f. Said tube-grasping body holder 3l is capable of moving back and forth (the arrow F) by a sliding means such as a cylinder (not shown in the figure), in the longitudinal direction of the hairpin tube 7, within a prescribed pitch. Also, the guide-pipe 3c is screwed and connected to the guide-pipe holder 3d by the bolt 3h formed at the other side. Said guide-pipe holder 3d is capable of moving back and forth (the arrow G) by a sliding means such as a cylinder (not shown in the figure).

Four of said tube-contacting parts 3f of the tube-grasping body 3 are formed in the longitudinal direction of said tube-enlarging mandrel 2 to enclose the exterior circumferential surface of said tube-enlarging mandrel 2 (for example, if 6 is proper for a specific exterior diameter of the tube, then 6 or other number is set). Also, between the tube-contacting parts 3f, slits, each of which has a uniform length and a uniform separation width of a prescribed width 3u, are formed at four places (the quantity of such slits does not have to be 4 and is properly determined in proportion to the count of tube-contacting parts 3f). Through said slits, the diameter of each of the tube-contacting parts 3f is decreased in the axial direction of the tube-enlarging mandrel 2, as the guide-pipe 3c is advanced, by the guide-pipe holder 3d, toward the heat exchanger, in order to press and slide along the slope 3b which has been formed on the exterior surface of each of said tube-contacting parts 3f, and which is slanted in the widening direction toward the opening 7b of the corresponding tube 7. It is structured by a so-called collet chuck. The tube-grasping bodies 3 in their multitudes (not shown in the figure) with said plural tube-contacting parts 3f are installed along the surface of said component-loading platform 1c, in order to be faced with each of the opening 7b of hairpin tubes 7 being inserted into the heat exchanger 5.

4 is an enclosing-body shifting device comprising: a pair of enclosing-bodies 4a which is installed on said base platform 1b, and which is supported to rotate to enclose the hairpin part 7c of the hairpin tube 7 being inserted into the heat radiating fin 6 of said heat exchanger 5; a driving-cylinder 4e to drive to open or close said enclosing-body 4a; a base plane 4d with said driving-cylinder 4e and a pair of enclosing-bodies 4a; a guide rail 12 to slide said base plane 4d, to or from said component-loading 1c; and a round-trip cylinder 4f which enables said base plane 4d to move back and forth. Multiple quantity (not shown in the figure) of said pair of enclosing-bodies 4a are installed along the plane of said component-loading platform 1c, to be faced with each of the hairpin part 7c of hairpin tubes 7 which are inserted into the heat radiating fin 6 of the heat exchanger 5.

Explanation is given below about production of a heat exchanger 5, wherein a heat exchanger production apparatus 1 utilizes the tube-grasping body 3 configured as above, and the tube-enlarging mandrel 2 is inserted into the hairpin tube 7. First, as shown in FIG. 1, the heat exchanger 5 is installed on said component-loading platform 1c, and, subsequently, said heat exchanger 5 is pressed and fixed between the component-loading platform 1c and the pressing-plate 11, by lowering the pressing-plate 11 located above.

Next, the base plane 4d is advanced (not shown in the figure) along the guide rail 12, by operating the round-trip cylinder 4f of the enclosing-body shifting device 4. At the same time, the driving-cylinder 4e is operated, in order to enclose the hairpin part 7c of each of hairpin tubes 7, as indicated in FIG. 11, by the tongue shaped concavity 4g which resembles a tongue when viewed from the plane of a pair of enclosing-bodies 4a. Corresponding to said tongue shaped concavity 4g, a tongue shaped convexity 4c, which resembles a tongue when viewed from said plane, is formed on the interior surface of said tongue shaped concavity 4g. Said tongue shaped convexity 4c turns around the U-shaped interior circumferential surface of said hairpin part 7c in order to firmly stop the shrinkage of the hairpin tube 7 during the enlarging process.

Next, from the opening 7b of each of said hairpin tubes 7, as shown in FIG. 2(*c*), by inserting (the arrow A) each of the tube-enlarging mandrels 2 by a prescribed depth, the enlargement portion 7d with a prescribed length is formed. Subsequently, by advancing (the arrow B) the tube-grasping body 3, by the tube-grasping body holder 3l, from the opening 7b of the hairpin tube 7, toward the circumferential surface 7e of said enlargement portion 7d, the tube-grasping body 3 becomes connected to the exterior of said circumferential surface 7e, in the state where said circumferential surface 7e is surrounded by the tube-contacting parts 3f.

Afterwards, if the guide-pipe 3c is moved (the arrow C), by the guide-pipe holder 3d, in the same direction of the movement of the tube-enlarging mandrel 2, the guide-pipe 3c presses the slope 3b while sliding along the same slope which has been formed on the exterior surface of each of said tube-contacting parts 3f, and which is slanted in the widening direction toward the opening 7b of the corresponding tube 7. Thus, the diameter of the tube-contacting parts 3f is reduced in the axial direction of the tube-enlarging mandrel 2, through the space isolation of the prescribed width 3u of the slits 3a. As a result, each of said tube-contacting parts 3f becomes to firmly grasp and support the circumferential surface 7e of the enlargement portion 7d of the hairpin tube 7.

Next, from this state, by moving said tube-enlarging mandrel 2 toward the hairpin part 7c of the hairpin tube 7, in order to support both of the hairpin part 7c and the opening 7b of the hairpin tube 7, it is possible to produce a heat exchanger, still keeping shrinkage of the entire length of hairpin tubes 7 at a minimum.

Also, when the tube-enlarging mandrel 2 is advanced toward the hairpin part 7c of the hairpin tube 7 while the circumferential surface 7e of the enlargement portion 7d is firmly grasped, as explained above, by plural tube-contacting parts 3f of the tube-grasping body 3, at the side of the opening 7b of the hairpin tube 7; the enclosing-body shifting device 4, equipped with the enclosing-bodies 4a capable of enclosing said hairpin part 7c, is moved back little (not shown in the figure) in the same direction of the movement of the tube-enlarging mandrel 2, in order to give some tensile strength for the entire hairpin tube 7. Thus, It is possible to produce a heat exchanger, keeping the shrinkage of the entire length of the hairpin tube 7 at a minimum, and considering the problem of shrinking of the entire length of the hairpin tube 7 during the enlarging process, as well as the problem of escaping of the hairpin tube 7 from the tube-contacting parts 3f and the enclosing-body 4a. As a result, it is possible to produce a heat exchanger, still keeping the material cost at a minimum.

Thus, it is possible to firmly grasp, by each of the tube-grasping bodies 3 having plural tube-contacting parts 3f, each of hairpin tubes 7 sitting at the interior side in the heat exchanger, as well as each of the tubes sitting at the exterior side in the heat exchanger, even for the following example cases: the case where hairpin tubes 7 are inserted into the heat radiating fin 6 of a heat exchanger 5 in a zigzag pattern (not shown in the figure); and the case where hairpin tubes 7 are inserted in a zigzag pattern, in multiple columns such as columns of 3, 4, or etc. (not shown in the figure) to decrease the gap (the insert pitch) between each of hairpin tubes 7.

Thus, since the tube-contacting parts 3f of said tube-grasping body 3 grasp the circumferential surface 7e of the enlargement portion 7d of the hairpin tube 7, by decreasing the diameter of the tube-contacting parts 3f in the axial direction, through the slits which are of a prescribed width 3u, and which are formed between each of the tube-contacting parts 3f, even for the case where the diameter of the hairpin tube 7 being enlarged is different according to the spec of the heat exchanger; it is possible to firmly and surely grasp the side of the opening 7b of the hairpin tube 7, by adjusting through the space distance of the slits 3a of a prescribed width 3u, between each of the tube-contacting parts 3f, even if there is little difference in each of diameters of the tubes. Also, as for the hairpin part 7c, since there is no need to replace the hook body 10 with another hook body having an almost identical circular arc to the interior circumference of the hairpin part 7c, in order to adapt to the different hairpin part 7c of hairpin tubes 7 with different diameters; and since it is possible to firmly and surely grasp by a pair of enclosing-bodies 4a, without altering the circular arc of the hairpin part 7c of the hairpin tube 7; it is possible to produce a heat exchanger, performing the enlarging process desired, without altering the heat exchanger production apparatus, even for the following cases: the case where the exterior diameter (the diameter of the tube, measured considering the circular arc) of the hairpin tube 7 being enlarged is different according to the spec of the heat exchanger 5, and the case where the entire length of hairpin tubes 7 is somewhat different.

Also, relating to the case where the hairpin part 7c of the hairpin tube 7 is firmly and surely enclosed by a pair of enclosing-bodies 4a as shown above, it is possible to exchange a pair of enclosing-bodies 4a to other type with a proper opening size, width, and length, according to the gap between insert tubes facing each other and the distance extruded from the terminal side of the heat radiating fin 6 of the hairpin part 7c of the hairpin 7; even for any of the following example cases:

the case where hairpin tubes 7 are inserted into a heat radiating fin 6 of a heat exchanger 5 in the same zigzag pattern (not shown in the figure) as above, and
the case where hairpin tubes 7 are inserted in a zigzag pattern, in multiple columns (not shown in the figure) such as columns of 3, 4, or etc. to decrease the gap between each of hairpin tubes (the insert pitch).

However, unlike the hook body 10 of the prior art, since the hairpin part is enclosed by a pair of enclosing-bodies 4a, there exists some permissible range and it is thus possible to avoid frequent change of the hook body 10. However, the most important point is the fact that it is possible to firmly fix the hairpin part 7c of each of the hairpin tubes 7 sitting at the interior side in the heat exchanger, as well as the hairpin part 7c of each of the hairpin tubes sitting at the exterior side in the heat exchanger, by allocating a pair of enclosing bodies 4a to each of the hairpin parts 7c.

Also, even if insert tubes 7 of other types than the hairpin tube are inserted, for example, if multiple straight tubes (not shown in the figure) are inserted, it is possible to produce a high quality heat exchanger with high precision, by enclosing and supporting, by a pair of the enclosing-bodies 4a, an end of the straight tube extruding from the terminal side of the heat radiating fin 6, and by inserting the tube-enlarging mandrel 2 into the opening 7b of the other end of the straight tube, by the same procedure as shown above.

Therefore, even for the case where insert tubes are inserted into a heat radiating fin, in multiple columns such as columns of 3, 4, or etc. to decrease the gap between insert tubes, and the case where the diameter of insert tubes being enlarged is different according to the spec of the heat exchanger, it is possible to firmly grasp and perform the enlarging process for insert tubes sitting at the interior side in the heat exchanger, as well as the tubes sitting at the exterior side in the heat exchanger. As a result, it is possible to produce a high quality heat exchanger, still keeping the material cost at a minimum by maintaining shrinkage of total length of insert tubes at a minimum.

Also, as shown in FIG. 2(d), if a bump 3e is formed at each of the tube-contacting parts 3f for pressing (the arrow D) the circumferential surface 7e of said enlargement portion 7d, at the position where each of the tube-contacting parts meets the enlargement portion 7d of the hairpin tube 7, in order to build up the extruded-part 7g extruding from the interior circumferential surface 7f of said hairpin 7, in the axial direction of the tube-enlarging mandrel 2; it is possible to surely set the reference location of the opening 7b during the enlargement process, and therefore, it is possible to produce a high precision heat exchanger by the enlarging process with higher precision.

On the other hand, the method, which is very similar to the Japanese Patent 10-85878, and which still considers the situation explained in FIG. 2(d) above, is Japanese Patent 9-99334 wherein a slope is formed in front of the bump which is formed at each of the tube-contacting parts, in order to prevent said opening from being deformed by a collision with the opening; a slope is formed in front of the guide pipe, for reducing the sliding abrasion against the slope on the exterior surface of each of said tube-contacting parts; a bolt is formed on the exterior circumferential surface of the tube-contacting part, a nut is formed on the interior circumferential surface of the guide-pipe, and said guide-pipe is screwed by said bolt and nut and installed for moving said guide-pipe back and forth.

TECHNICAL DOCUMENT OF THE PRIOR ARTS

Reference Cited

PATENT DOCUMENT 1: JP-PATENT-A-S63-188433
PATENT DOCUMENT 2: JP-PATENT-A-H10-85878
PATENT DOCUMENT 3: JP-PATENT-A-H9-99334

SUMMARY OF THE INVENTION

Problems to be Solved by the Invention

Current invention resolves the problems explained below. That is, according to the heat exchanger production apparatus 1 configured as above, since the tube-enlarging mandrel 2 is connected from its exterior to the tube-grasping body 3 to enable to move the tube-grasping body along the tube-enlarging mandrel 2;

said tube-grasping body 3 is equipped with a plurality of tube-contacting parts 3f on which the slopes 3b are formed and slanted in the widening direction, toward the side of the opening 7b of the corresponding tube 7, and which are capable of radially expanding or axially compressing (the arrow E) in the cross direction of the longitudinal length of said hairpin tube 7;

said slope 3b is formed to reach the end-line 3o of the tube-contacting part 3f;

said tube-grasping body 3 is screwed and connected to the tube-grasping body holder 3l by the bolt 3k formed at the other side, the opposite side of said tube-contacting parts 3f. Said tube-grasping body holder 3l is capable of moving back and forth (the arrow F) by a sliding means such as a cylinder (not shown in the figure), in the longitudinal direction of the hairpin tube 7, within a prescribed pitch; and the guide-pipe 3c is also screwed and connected to the guide-pipe holder 3d by the bolt 3h formed at the other side. Said guide-pipe holder 3d is capable of moving back and forth (the arrow G) by a sliding means such as a cylinder (not shown in the figure);

by sliding said guide-pipe 3c toward the opening 7b of the tube 7 along the slopes 3b of the tube-contacting parts 3f, the diameter of the tube-contacting parts 3f is reduced in the axial direction. At the same time, the bump 3e, which is formed at the side of the opening 7b on the interior surface of each of the tube-contacting parts 3f, presses the circumferential surface 7e of the enlargement portion 7d of the hairpin tube 7, in order to form an extruded-part 7g extruding in the axial direction of the tube 7. Thus, the tube-contacting parts become to firmly grasp and support the tube, and, therefore, it is possible to accurately set the reference point of the opening 7b, during the enlarging process, such that producing a high precision heat exchanger is possible by the higher precision enlarging process. However, since, in the tube-grasping body 3 configured as above, the slope 3b of each of the tube-contacting parts 3f is formed to reach the end-line 3o of each of the tube-contacting parts 3f, it is necessary to advance said guide-pipe 3c, while sliding along the slopes 3b, to the position where the end-line of the guide-pipe 3c contacts the end-line 3o of the tube-contacting part 3f.

Recently, there exists a trend of downsizing, not only the heat exchanger 5 itself (tubes being downsized and etc.), but also straight tubes or hairpin tubes 7 being inserted into the heat radiating fin 6 of said heat exchanger 5, due to the problems of saving in energy and cost. Therefore, it is needed to have a heat exchanger 5 with a smaller gap between each of tubes 7 than the prior arts, for the following example cases: the case where straight tubes or hairpin tubes 7 are inserted in a row (not shown in the figure) into the heat radiating fin 6 of the heat exchanger 5, the case where tubes 7 are inserted in a zigzag pattern (not shown in the figure), and the case where tubes 7 are inserted in multiple columns such as columns of 3, 4, or etc (not shown in the figure).

On the other hand, according to the heat exchanger production apparatus 1 configured as above, even if the diameter of the hairpin tube 7 of the heat exchanger 5 being enlarged is different according to the spec of the heat exchanger 5, since the circumferential surface 7e of the enlargement portion 7d of the hairpin tube 7 is grasped by each of the tube-contacting parts 3f of the tube-grasping body 3, by adjusting, within some range, the space distance of a prescribed width 3u of each of the slits 3a which are formed between each of the tube-contacting parts; it is possible to firmly and surely grasp the side of the opening 7b of the hairpin tube 7, by automatically adapting to the difference in tube diameter through the slits between each of the tube-contacting parts 3f. However, unfortunately, according to the tube-grasping body 3 of the prior art, since the slope 3b of each of the tube-contacting parts 3f is formed to reach the end-line 3o of each of the tube-contacting parts 3f, it is necessary to advance the end-line of the guide-pipe 3c to the end-line 3o of the tube-contacting part 3f, during shrinking of the diameter of the tube-contacting parts 3f of the tube-grasping body 3. Thus, if both of exterior diameters of the tube-contacting parts 3f and the tube-grasping body 3 are minimized, the exterior diameter of the guide-pipe 3c being connected at the exterior of the tube-grasping body 3 is automatically determined as the reference diameter (the interior diameter itself when viewed from the guide-pipe 3c), the exterior diameter measured between summits of the opposing slopes 3b which are faced each other, and which are formed to reach the end-line 3o of the corresponding tube-contacting parts whose diameter is being decreased during the enlargement. Thus, there is a problem in the exterior diameter of each of the guide-pipes 3c, in order to allocate to each of straight tubes or hairpin tubes 7, when the gap between the tubes is significantly reduced. As a result, due the problem of contacting neighboring guide-pipes 3c, there exists a problem of developing a limit in the gap (pitch) between each of the tube-grasping bodies 3, in allocating each of straight tubes or hairpin tubes 7 to a tube-grasping body 3 which is connected at its exterior to guide-pipe 3c.

Also, according to PATENT DOCUMENT 3 of the prior arts, a bolt is formed on the exterior circumferential surface of the tube-contacting part, and a nut is formed on the interior circumferential surface of the guide-pipe, in order to join them together and move said guide-pipe back and forth. However, if the gap between each of straight tubes or hairpin tubes 7 being inserted into said heat radiating fin 6 is significantly reduced comparing to the prior arts, there exists the same problem as above, such a problem as a limit in the gap between each of the tube-grasping bodies 3, due to the problems such as the height of the threads of the bolt and nut or the gap (pitch) between screws. Thus, to resolve problems such as the cost and the configuration for any of cases above, it is requested the development of a tube-grasping body 3 or a heat exchanger production apparatus utilizing said tube-grasping body 3, wherein said tube-grasping body 3 is simply configured to slide back and forth, toward the opening 7b, in order to radially expand or axially compress said tube-contacting parts 3f of the tube-grasping body 3; and said tube-grasping body 3 is able to significantly reduce the gap (pitch), still avoiding the contact with neighboring guide-pipes 3c, even when the gap between each of straight tubes or hairpin tubes 7 being inserted into the heat radiating fin 6 is significantly reduced.

Also, not limiting to the case where the gap between each of straight tubes or hairpin tubes 7 being inserted into the heat radiating fin 6 is significantly reduced comparing to the prior arts, for example, if the exterior diameter of the enlargement portion of the tube is smaller than the interior diameter of the tube-grasping body 3 or the interior diameter between tube-contacting parts 3f of said tube-grasping body 3, it is possible for the tube-grasping body 3 or the tube-contacting parts 3f to grasp the exterior circumferential surface 7e of the enlargement portion 7d of each of straight tubes or hairpin tubes 7. However, if the exterior diameter of the enlargement portion 7d of the tube 7 is about the same size as the interior diameter of the tube-grasping body 3 or the interior diameter between the tube-contacting parts 3f of said tube-grasping body 3 (the interior diameter between the bumps 3e if bumps 3e are formed), or if the axis of said enlargement portion 7d is away, by some degree, relative to the longitudinal direction of the tube-enlarging mandrel 2, from the axis of the tube-grasping body 3, there develops a case where the end-line 3o of each of the tube-contacting parts 3f contacts the opening 7b of the tube such that at least one of them is damaged. Thus, an improvement is required.

The current invention relates to a production method of the tube-grasping body for grasping an insert tube in a heat exchanger, and heat exchanger production methods and apparatuses utilizing the tube-grasping body, and an air-conditioner and/or its outdoor unit with a heat exchanger produced by the method or the apparatus.

The current invention provides a tube-grasping body for grasping an insert tube in a heat exchanger, heat exchanger production methods and apparatuses utilizing the tube-grasping body, and an air conditioner and/or an outdoor unit equipped with the heat exchanger produced by the methods and apparatuses; in order to produce a heat exchanger wherein the total length of the insert tubes is kept at an almost same level even after the enlargement, still satisfying the following requirements:

preventing one end from being transformed or deformed by collision of the end-line of the tube-contacting parts of the tube-grasping body, with the opening of the tube where the enlargement portion is formed;

preventing a contact with neighboring guide-pipes, when allocating a tube-grasping body being connected at its exterior to the guide-pipe, to each of straight tubes or hairpin tubes; and firmly supporting the enlargement portion of each of the tubes sitting at the interior side in the heat exchanger, as well as that of each of the tubes sitting at the exterior side in the heat exchanger, in the following heat exchangers:

a downsized heat exchanger where the gap (pitch) between each of the tube-grasping bodies is minimized, and a heat exchanger where the gap between each of the tubes is significantly reduced;

to resolve all the problems occurring in the following example cases:

the case where the gap between straight tubes or hairpin tubes is decreased, due to downsized insert tubes due to savings in energy or cost (use of downsized tubes or downsized heat exchanger itself);

the case where the gap between insert tubes is decreased due to insertion of straight tubes or hairpin tubes into a heat radiating fin in a zigzag pattern;

the case where the gap between insert tubes is decreased to enable them to be inserted into a heat radiating fin in multiple columns such as columns of 3, 4, or etc.;

the case where the diameters of insert tubes being enlarged are different according to the spec of the heat exchanger;

the case where the gap between each of straight tubes or hairpin tubes being inserted into said heat radiating fin is significantly decreased comparing to the prior arts;

the case where the exterior diameter of the enlargement portion of the insert tube becomes about the same size as the interior diameter of the tube-grasping body itself or the interior diameter between the tube-contacting parts (the interior diameter between the bumps if bumps are formed on the interior surface of the tube-contacting parts); and the case where the axis of said enlargement portion is away, by some degree, relative to the direction of the longitudinal length of the tube-enlarging mandrel, from the axis of the tube-grasping body.

Means for Solving the Problems

The manufacturing processes are from the other end of a tube-grasping body 3 with predetermined full length the opening 7b side of a tube 7 is cut and then the inside of this tube-grasping body 3 is cut with a predetermined depth on the one end towards the inside diameter direction of the tube-grasping body 3 with a slit near the one end inside the tube-grasping body 3. The swelling part 3z which carries out swelling in the direction of the axis of the tube-grasping body 3 which should form an inside diameter, after the swelling part 3z has been constituted, the process is carried out towards the longitudinal direction of a tube 7 to a tube-grasping body 3. It is a formation intersecting towards the direction of two or more tube-contacting parts 3f which are free to radially expand and contract.

By forming two or more slits 3a between the prescribed widths 3u in the other end with a predetermined length size along the longitudinal direction of a tube-grasping body 3 from the one end of this tube-grasping body 3, the process of forming two or more tube-contacting parts 3f equipped with the bump 3e which divides the above-mentioned swelling part 3z into the number of slits 3a through the two or more slits 3a is projected in the direction of the axis of a tube-grasping body 3. By extending to carry out the curve expansion of each prescribed width 3u of the slit 3a gradually and radially towards the direction of a tube-contacting part 7b of the above-mentioned tube 7 near the predetermined part and expand its expanded width 3x. It is prepared in the external surface of each tube-contacting part 3f, and the process of forming bigger from the predetermined part of a tube-contacting part 3f than the inclination degree of the slope 3b at the time of formation of a slit 3a the inclination degree of the slope 3b sloping in the direction which spreads toward the opening 7b of the tube 7 which counters to the tube-grasping body 3. This is the manufacturing process of a tube-grasping body 3 with two or more tube-contacting parts 3f equipped with the bump 3e projected in the direction of the axis.

The invention mentioned in Claim 2 is used for the heat exchanger production apparatus 1, and also the tube-enlarging mandrel (2) which can be pressed fit from the contacting part 7b of the tube 7 which is laid across by the heat radiating fin 6 of the heat exchanger 5. Moreover, in the longitudinal direction, the above-mentioned tube 7 having radially two or more sorbent tube-contacting parts 3f are free to expand and contract towards the crossing. The opening 7b of the tube 7 which counters the external surface of a sorbent tube-contacting parts 3f, the wide slope 3b sloping in the direction is formed, and, moreover, the slope 3b of this sorbent tube component through the slide which carries out a slide in the longitudinal direction of a pipe enables a free circuition. Each sorbent tube-contacting part 3f with the production method of the tube-grasping body 3 of the heat exchanger inserting the pipe made to expand and contract radially on the one end which serves as the opening 7b lateral projection of a tube 7 from the other end side of and a tube-grasping body 3 cutting the inside of a tube-grasping body 3 with a predetermined depth size—1 inside a tube-grasping body 3 to an end close-attendants side, an inside diameter smaller than the inside diameter of the cut tube-grasping body 3 should be formed. The process of forming the swelling part 3z which carries out swelling in the tube-grasping body 3 direction of an axis, and the swelling part before forming 3z, or after forming a swelling part 3z, the one end side of this tube-grasping body 3 the direction which spreads toward the opening 7b side of the tube 7 which counters an end-line 3o inner circumference side. The process of it being alike and forming the slope 3m by cutting or polishing, and two or more sorbent tube components that expand and contract radially/towards intersecting a tube-grasping body 3 with the longitudinal direction of a tube 7.

By forming two or more slits 3a between prescribed widths 3u in the other end with a predetermined length size along the longitudinal direction of a tube-grasping body 3 from the one end of this tube-grasping body 3 that should be formed, the process of forming two or more sorbent tube-contacting parts 3f equipped with the bump 3e which divided the above-mentioned swelling part 3z into the number of slits 3a through the two or more slits 3a, and was projected in the direction of an axis of a tube-grasping body 3. By extending in order to carry out a curve expansion of each prescribed width 3u of the slit 3a gradually radiates toward the direction of a opening 7b of the above-mentioned tube 7 near the predetermined part and have an expanded width 3x. It is prepared in the external surface of each sorbent tube-contacting parts 3f, and the process of forming it bigger than the predetermined part of a sorbent tube-contacting parts 3f and the inclination degree of the slope 3b at the time of formation of a slit 3a and the inclination degree of the slope 3b sloping in the direction which spreads toward the opening 7b of the tube 7 which counters the tube-grasping body 3. It is to manufacture a tube-grasping body 3 with two or more sorbent tube-contacting parts 3f equipped with the bump 3e projected in the direction of an axis.

The invention given in Claim 3 is a production method of said Claim 1 or a tube-grasping body 3 given in 2. It is inclined in the direction which is alike and sets and spreads toward the opening 7b side of the tube 7 which counters. A slope 3b is the above-mentioned grip before formation of the slit 3a between prescribed widths 3u. It is formed by cutting or grinding the perimeter of the tube-grasping body 3.

In the production method of a tube-grasping body 3 given in any of the said Claims 1 to 3 they are the invention given in Claim 4. By extending to carry out a curve expansion of each prescribed width 3u of the slit 3a gradually and radially towards the direction of a opening 7b of the above-mentioned tube 7 near the predetermined part and to have an expanded width 3x, the process which is prepared in the external surface of each sorbent tube-contacting parts 3f, and the inclination degree of the slope 3b sloping in the direction which spreads toward the opening 7b side of the tube 7 which moreover counters is incurvated in a greater degree than the inclination degree of the slope 3b at the time of formation of a slit 3a, and is formed. It is being carried out using the cylindrical jig equipped with two or more acute convex-like objects in order to be inserted in the slit 3a between an approximately cone-like jig or each prescribed width 3u pressed fit in the direction of the other end from the one end of this tube-grasping body 3.

Invention given in Claim 5 is a production method given in any of the said Claims 1 to 4. It is a production method of a heat exchanger using the grip object of the heat exchanger insertion pipe manufactured. The hairpin part is inserted by the radiating fin of the heat exchanger and sandwiched with a clamp object, and the movement to the tube-connecting lateral projection is regulated, or after regulating movement to the tube-connecting lateral projection with the locking object in which the entrance and exit are free towards intersecting the longitudinal direction of a hairpin pipe inserted by the radiating fin of the heat exchanger. The first process of pressing the mandrel for extending pipes fit with a predetermined depth size from the tube-connecting part of the hairpin pipe, forming a predetermined extending pipe. The inclination degree of an outside slope is curved to a bigger degree, making exposure carry out curve expansion of the slits between predetermined width sizes prepared in the longitudinal direction which meets in the reciprocation direction of the mandrel for extending pipe gradually towards the direction of the tube-connecting part of the above-mentioned pipe from a predetermined part, and forming an expansion width size. It is prepared in the second process that external fit of the grip object of the heat exchanger inserts into the pipe with which two or more sorbent tube components which enable free expansion and contraction were prepared radially in the state of envelopment in a heat-shrinking pipe, and the external surface of the above-mentioned pipe connecting. And through the slide means the slope which carried out the curve inclination carries out pressure carrying out the slide of the slope of the sorbent tube component formed in the inclination degree at a large extent in the direction which spreads toward the tube-connecting part of the pipe which counters toward the tube-connecting part of a pipe from the predetermined part of a sorbent tube component. Make it shrink in the direction of an axis of the mandrel for extending pipes, and through each sorbent tube component in order to contract gradually the expansion width size which carried out a curve expansion of the predetermined width size of each slit between sorbent tube components from the predetermined part. The circumferential side of the extending pipe is firmly held through the bump of each sorbent tube component. It is in manufacturing a heat exchanger from the fourth process of unifying a radiating fin and a pipe by pressing the mandrel for extending pipes fit in a pipe further where it holds firmly the circumferential side of the extending pipe of the third process and the above-mentioned pipe is held with the bump of each sorbent tube component of a grip object.

The invention given in Claim 6 is the air conditioner equipped with a heat exchanger manufactured by the production method given in the said Claim 5.

Invention given in Claim 7 is the heat exchanger manufactured by the production method given in the said Claim 5 offering an outdoor unit with the air-conditioning machine.

The Effect of the Invention

This invention is used for the heat exchanger production apparatus 1, and the present invention is heat dissipation of a heat exchanger 5. Mandrel for extension pipes can be pressed fit from the opening 7b of the tube 7 inserted by heat radiating fins 6. Moreover, intersects with the longitudinal direction of the above-mentioned tube 7 radially two or more sorbent tube-contacting parts 3f in which free expansion and contraction and slope in the direction which spread toward the opening 7b of the tube 7 which counters the external surface of this sorbent tube-contacting parts 3f is formed. And it is a production method of the tube-grasping body 3 of the heat exchanger inserted into the pipe which each of the sorbent tube-contacting part 3f is made to expand/contract radially through the slide means which makes it slide freely in the circumference of the slope 3b of this sorbent tube-contacting parts 3f in the longitudinal direction of the pipe. Cut the inside of this tube-grasping body 3 with a predetermined depth size to the one end side which serves as the opening 7b in lateral projection of a tube 7 from the other end of a tube-grasping body 3 with predetermined full length, near the one end inside a tube-grasping body 3. The process of forming the swelling part 3z which carries out swelling in the direction of an axis of a tube-grasping body 3 an inside diameter smaller than the inside diameter of the cut tube-grasping body 3 is being formed. After the swelling part 3z is formed, on a tube-grasping body 3 that two or more sorbent tube-contacting parts 3f in which expansion/contraction is free should be radially formed towards intersecting the longitudinal direction of a tube 7. By forming two or more slits 3a between prescribed widths 3u in the other end with a predetermined length size along the longitudinal direction of a tube-grasping body 3 from the one end side of this tube-grasping body 3. The process of forming two or more sorbent tube-contacting parts 3f equipped with the bump 3e which divided the above-mentioned swelling part 3z into the number of slits 3a through the two or more slits 3a, was projected in the direction of an axis of a tube-grasping body 3. By extending in order to carry out curve expansion of each prescribed width 3u of the slit 3a gradually radially towards the direction of a opening 7b of the above-mentioned tube 7 near the predetermined part and to have an expanded width 3x. It is prepared in the external surface of each sorbent tube-contacting parts 3f, and process a bigger forming than the predetermined part of a sorbent tube-contacting parts 3f the inclination degree of the slope 3b sloping in the direction which spreads toward the opening 7b of the tube 7 which counters from the inclination degree of the slope 3b at the time of formation of a slit 3a to the tube-grasping body 3 since a tube-grasping body 3 with two or more sorbent tube-contacting parts 3f equipped with the bump 3e projected in the direction of an axis is manufactured, according to the tube-grasping body 3 manufactured by this production method. When making a sorbent tube-contacting parts 3f the outside shrinks from the opening 7b of a tube 7. The diameter of the maximum open diameter 3y and the amount of expansion/contraction ranges from each tube-contacting part 3f which counters the opening 7b of this tube 7 are made to expand more than the diameter of the maximum opening and expansion/contraction range of each sorbent tube-contacting parts 3f which is formed through the slit 3a between prescribed widths 3u becomes possible—therefore, the exterior diameter 7i of the enlargement portion 7d on the opening 7b of a tube 7—the inside diameter of the tube-grasping body 3 itself, and the inside diameter (inside diameter between bumps) between the sorbent tube-contacting parts 3f—are shortened, even when it becomes the same path. Moreover, as the direction of an axis of the enlargement portion 7d which meets in the longitudinal direction of a mandrel shifts from the direction of the axis to the tube-grasping body 3 even if it is a case where it inclines a little, passing each sorbent tube-contacting parts 3f to which the diameter of the maximum open diameter 3y and the amount of expansion/contraction ranges were made to expand—the opening 7b of the tip of a sorbent tube-contacting parts 3f and a tube 7 is in contact causing the effect that any one side can be certainly prevented from being changed and damaged as being produced.

Furthermore, the present invention in the above-mentioned tube-grasping body 3 expands/contracts radially and two or more free sorbent tube-contacting parts 3f radiate near the predetermined part towards the direction of an opening 7b of the above-mentioned tube 7 in each prescribed width 3u of a slit 3a. By extending to carry out a curve expansion and to expanded width 3x, each sorbent tube-contacting part 3f goes to the opening 7b of the tube 7 which is formed in the external surface of the material, and moreover counters formation of a slit 3a about the inclination degree of the slope 3b sloping in the spreading direction. It constitutes larger from the predetermined part of a sorbent tube-contacting part 3f than the inclination degree of the slope 3b at the time. Therefore, the diameter of the maximum open diameter 3y and the expansion/contraction range of each sorbent tube-contacting part 3f and the quantity through an expanded width 3x from the slit 3a between prescribed widths 3u are greater. Even in the case where it is made to substantially expand, from the predetermined part of each sorbent tube-contacting part 3f an inclination degree passing the slope 3b has formed more smoothly than that of a guide-pipe 3c. The durability of parts not only increase but a guide pipe make it become proportional to the slide distance of c, and each sorbent tube-contacting part 3f opens the minimum diameter/of the maximum open diameter 3y up to a caliber (at the time different from the amount of contraction of the shape of counter-radiation of each sorbent tube-contacting part 3f by the outside diameter of the extension pipe, what is called grip operation—the amount of expansion/contraction ranges can be maximized easily to an effective adjustment.

Furthermore, the present invention is the above-mentioned sorbent tube component of this tube-grasping body 3. The bump 3e projected in the direction of an axis of a tube 7 to the inside of the tube-contacting part 7b is a predetermined depth size rewriting from the other end side of a tube-grasping body 3 about the inside of this tube-grasping body 3 to the above-mentioned one end. By cutting near the one end inside a tube-grasping body 3, cut tube-grasping body 3. The process of forming the swelling part 3z which carries out swelling in the direction of an axis of a tube-grasping body 3 of an inside diameter smaller than the internal diameter being formed. Before forming the swelling part 3z, or after forming a swelling part 3z, the process of forming the slope 3m sloping in the direction which spreads toward the tube-contacting part 7b of the tube 7 which counters in the end-line 3o inner circumference side of the one end of this tube-grasping body 3 by cutting or polishing, That two or more sorbent tube-contacting parts 3f in which free expansion/contraction should be radially formed in a tube-grasping body 3 towards intersecting the longitudinal direction of a tube 7. By forming two or more slits 3a between prescribed widths 3u in the other end side with a predetermined length size along the longitudinal direction a tube-grasping body 3 from the one end side of this tube-grasping body 3. From being prepared in the number of sorbent tube-contacting parts 3f by dividing the above-mentioned swelling part 3z into the number of slits 3a through the two or more slits 3*a*, the projection size (height size) of the bump 3*e* itself, the full length (the length of the bump 3*e* which met in the direction of an axis of a tube-grasping body 3) of the bump 3*e* itself, etc. The kind of pipe for an extension pipe on the bump 3*e* not only produces the effect on the manufacture which can be easily formed by cutting according to the quality of the material etc.

Further, in the present invention, the inclined slope 3*b* in the outward direction from the opening 7*b* of the corresponding tube 7 is formed by cutting or grinding the outer side of the above-described tube-grasping body 3 before forming slits 3*a* of a prescribed width 3*u*. Therefore, it has the effect during cutting or polishing of being able to form a slope 3*b* with high accuracy on the outer peripheral surface of the tube-grasping body 3 in the absence of slits 3*a* and without bending.

In addition, the present invention has slits 3*a* established on the exterior surface of each of the tube-contacting parts 3*f* by means of an expanded width 3*x* gradually curving and expanding the prescribed width 3*u* toward the opening 7*b* of the tube 7 direction from a predetermined position for each of the respective slits 3*a*. Moreover, the process of forming the degree of inclination of the slope 3*b* sloping in a direction that extends toward the opening 7*b* of the corresponding tube 7 largely from each predetermined position of the tube-contacting parts 3*f* from the degree of inclination of the slope 3*b* when forming slits 3*a*, is conducted using either a roughly cone-shaped jig indented in the direction from one end of the said tube-grasping body 3 to the other end, or a cylindrical jig with multiple acute bumps that are to be inserted into slits 3*a* of each prescribed width 3*u*. Therefore, there is an effect whereby slits 3*a*, which are to have slopes 3*b* with uniform degrees of inclination (angles of inclination), can be spread evenly.

Furthermore, the manufacturing method of the heat exchanger using a tube-grasping body with a heat exchanger through pipe produced by the above-described manufacturing method restricts the movement in the tube opening direction by clamping in a clamp unit the hairpin section of a hairpin tube which is inserted through the heat radiating fins of the heat exchanger, or restricts the movement in the tube opening direction by means of a freely opening and closing locking unit in the direction crossing the opening of the hairpin tube, the hairpin section of the hairpin tube having been inserted through the heat radiating fins of a partially rewritten heat exchanger. After this, the first process of forming the prescribed enlargement portion is to insert the tube-enlarging mandrel at a prescribed depth from the opening of the said hairpin tube, which is formed through multiple slits of prescribed width established in a longitudinal direction aligned to the reciprocal direction of the tube-enlarging mandrel. Formed through a slit at the multiple prescribed widths in the longitudinal direction along the reciprocating direction of the tube-enlarging mandrel, and, at predetermined positions, the aforementioned slits, toward the tube opening direction of the aforementioned tube, with a gradually increasing bend at the aforementioned multiple prescribed widths, the multiple tubes that can expand and compress are provided radially in order to have a larger width; the tube-contacting part connects externally to the tube-grasping body of the heat exchanger insertion tube. The foregoing is the second process. In the direction of the openings of opposing tubes, through the aforementioned increased curve slit opening at the gradient of the slope, the slope of the tube-contacting part, the tube-contacting part, having been expanded at the prescribed points, while sliding in the direction of the openings of the tubes, via a sliding means for pressing, the said tube-contacting part, at predetermined points in prescribed widths of the slits, gradually increases; by reducing the diameter of the axial direction of the tube-enlarging mandrel, the exterior surface of the tube-enlarging part, via each tube-contacting part, is grasped firmly via the bump from each tube-contacting part. The foregoing is the third process. The fourth process integrates the radiating fin and the tube by making an indentation within the tube into the tube-enlarging mandrel, while still being grasped firmly via the bump from each tube-contacting part, the grasping unit being on the exterior surface of the tube-enlarging part of the above-mentioned tube. The above-mentioned swelling parts 3*z*, via multiple slits 3*a*, are divided by the number of slits 3*a*; thereby, multiple tube-contacting parts 3*f* are formed with bumps 3*e* that project in the axial direction of the tube-grasping body 3.

Each of the above-mentioned slits 3*a*, at predetermined points, towards the direction of the openings 7*b* of the said tubes 7, is spread out at the predetermined widths 3*u* so as to gradually have a greater curve at an expanded width 3*x*. By means of this, on the exterior surface of each tube-contacting part 3*f*, and, moreover, toward the openings 7*b* of the corresponding tubes 7 and the gradient angle of the slope 3*b* in a direction spreading out there from, when forming the slits 3*a*, the gradient angle of the slope 3*b* becomes formed with a greater size at the predetermined points of the tube-contacting parts.

According to the current invention, in the heat exchanger production and a production method, apparatus 1 configured as above, even if the diameter of hairpin tubes 7 in a heat exchanger 5 being enlarged is different according to the spec of the heat exchanger 5, it is possible for the tube-contacting parts 3*f* to firmly grasp the tube 7, by adjusting each of the tube-contacting parts 3*f* of the tube-grasping body 3 to automatically adapt to the diameter of the tubes through the slits 3*a* which are formed between each of said tube-contacting parts 3*f*. Also, the bumps 3*e*, which are formed at said tube-contacting parts 3*f*, press the circumferential surface 7*e* of the enlargement portion 7*d* at the side of opening 7*b* of hairpin tubes 7, in order to build up extruded-parts 7*g* extruding in the axial direction of the tube 7. Thus, it is possible to accurately set the reference location of the opening 7*b* during the enlargement process so that producing a high precision heat exchanger is possible by the higher precision enlarging process. Also, since the slope 3*b* which radially curved to the tube 7 is formed, on the exterior surface of each of the tube-contacting parts 3*f* of said tube-grasping body 3, at such a position that said slope 3*b* is not allowed to reach the end-line 3*o* of each of said tube-contacting parts 3*f*, even if the gap between branches of the hairpin tube or the gap between the neighboring hairpin tubes is significantly reduced comparing to the prior arts, shrinking of the diameter of each of the tube-contacting parts 3*f*, which is caused by the movement of the guide-pipe 3*c* toward the opening 7*b*, can be stopped before said guide-pipe 3*c* reaches the end-line 3*o* of the tube-contacting parts 3*f*.

Thus, when the exterior diameter 3*q* of the guide-pipe 3*c*, which is being connected at the exterior of the tube-grasping body 3 having the tube-contacting parts 3*f*, is determined as the reference diameter (the interior diameter 3*r* of the guide-pipe 3*c* when viewed from itself), the exterior diameter 3*n* measured between the summits of the slopes 3*b* of the opposing tube-contacting parts 3*f* which are faced each other, and whose diameter is being reduced during the enlargement through the slits 3*a*, it is possible to set the enlargement-occurring point 3s, where the diameter of the tube-contacting parts 3f becomes to be the exterior diameter 3n during the compression in the diameter of the tube-contacting parts 3f, at the location 3t, the location shifted from the end-line 3o of said tube-contacting parts 3f toward the side of the opening 7b, the opposite side of said end-line 3o of the tube-contacting part. Thus, it is possible to decrease the interior diameter 3r of the guide-tube 3c by the distance shifted. As a result, the exterior diameter 3q of the guide-pipe 3c is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3c whose diameter 3q has been decreased, from being hit by each of the neighboring guide-pipes 3c, when the opening 7b of each of straight tubes or hairpin tubes is being connected at its exterior by the tube-contacting parts of the tube-grasping body 3 equipped with said guide-pipe 3c. Thus, it is possible to provide an effect of well producing the heat exchanger 5, wherein the gap between insert tubes is significantly reduced for the following example cases: the case where the heat exchanger is downsized (downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

DETAILED DESCRIPTION OF THE INVENTION

The current invention relates to a production method of the tube-grasping body for grasping an insert tube in a heat exchanger, and heat exchanger production methods and apparatuses utilizing the tube-grasping body, and an air-conditioner and/or its outdoor unit with a heat exchanger produced by the method or the apparatus. In the following paragraphs, an embodiment of the current invention is explained.

The embodiment explained here relates to production of the following heat exchangers as examples:

a heat exchanger which is downsized, utilizing the heat exchanger production apparatus which is equipped with a guide-pipe as a sliding means, and which is also equipped with a tube-grasping body being connected at its exterior to said guide-pipe for enabling said guide-pipe to slide along said tube-grasping body, and a heat exchanger wherein the diameters of insert tubes are different or the gap between each of the tubes is significantly reduced.

However, in association with said heat exchanger production apparatus, the parts, which are identical to the prior arts, are not explained. Separate explanation is provided later about an embodiment of a tube-grasping body, wherein the slit with a prescribed width is gradually expanded to an expanded width from a prescribed location toward the opening of the tube, since its effect is different from that of an embodiment of a tube-grasping body with the slits which are not expanded in their widths.

Figure 1:
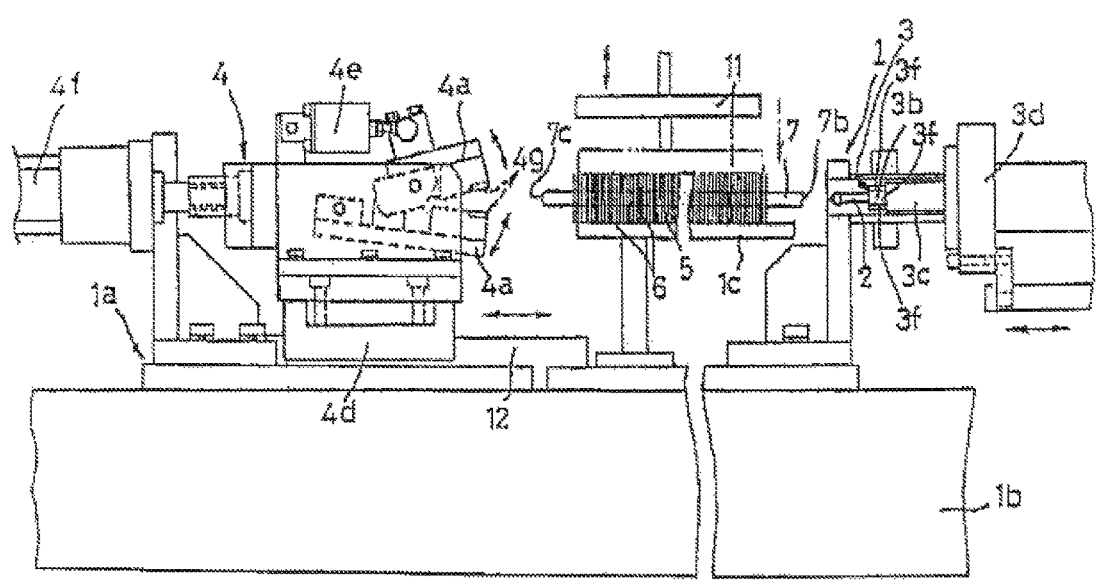
FIG. 1 illustrates a schematic diagram of a heat exchanger utilizing the tube-grasping body production apparatus according to the present invention.

First, in FIG. 1, it is explained about an embodiment of the heat exchanger production apparatus to implement the heat exchanger production method, the method having a guide-pipe and a tube-contacting part itself of the tube-grasping body for grasping an insert tube in a heat exchanger. The component-loading platform 1c loads a heat exchanger where the gap between branches of each of insert tubes or the gap between neighboring hairpin tubes 7 is significantly reduced, due to the following reasons:

the heat exchanger being downsized (by downsized tubes, or etc.) due to the problems of saving in energy or cost, hairpin tubes 7 being inserted into the heat radiating fin 6 in a zigzag pattern (not shown in the figure), and hairpin tubes 7 being inserted in multiple columns such as columns of 3, 4, or etc. (not shown in the figure).

Subsequently, said heat exchanger 5 is pressed and fixed between the component-loading platform 1c and the pressing-plate 11 by lowering the pressing-plate 11 located above.

Figure 11:
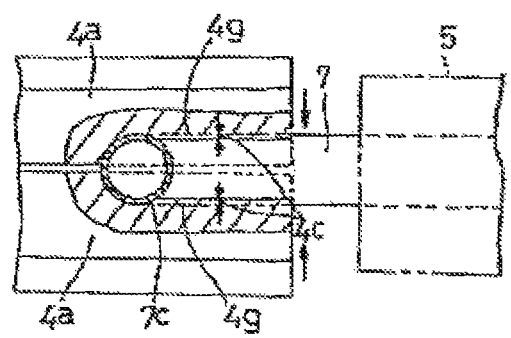
FIG. 11 illustrates an enlarged cross-sectional diagram of some of major components of the enclosing bodies, which is used in a heat exchanger production apparatus according to the prior arts.
Figure 12A:
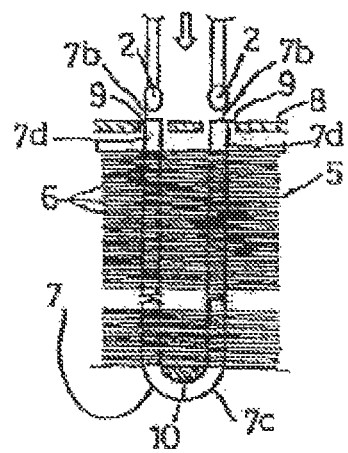
FIG. 12 illustrates a heat exchanger production apparatus of the prior arts, wherein (a) is an enlarged front view when the insert tube is enlarged, (b) is a perspective diagram of the clamp, and (c) is a perspective diagram of another embodiment of the clamp. Other features and advantages of the present invention will become apparent from the following detailed description, taken in conjunction with the accompanying drawings, which illustrate, by way of example, the principles of the invention.
Figure 12B:
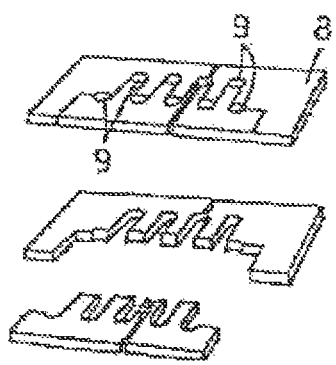
Figure 12C:
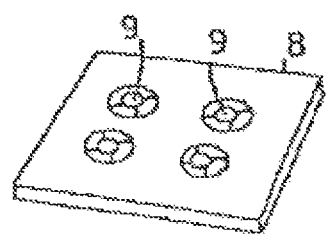

Next, the base plane 4d is advanced (not shown in the figure) along the guide rail 12, by operating the round-trip cylinder 4f of the enclosing-body shifting device 4. At the same time, the driving-cylinder 4e is operated, in order to enclose each of the hairpin part 7c extruded from the heat radiating fin 6 of the heat exchanger 5, as indicated in FIG. 11, by the tongue shaped concavity 4g which resembles a tongue when viewed from the plane of a pair of enclosing-bodies 4a. Corresponding to said tongue shaped concavity 4g, the tongue shaped convexity 4c, which resembles a tongue when viewed from said plane, is formed on the interior surface of said tongue shaped concavity 4g. Said tongue shaped convexity 4c turns around the U-shaped interior circumferential surface of said hairpin part 7c in order to firmly stop shrinkage of the hairpin tube 7 during the enlarging process.

Figure 2A:
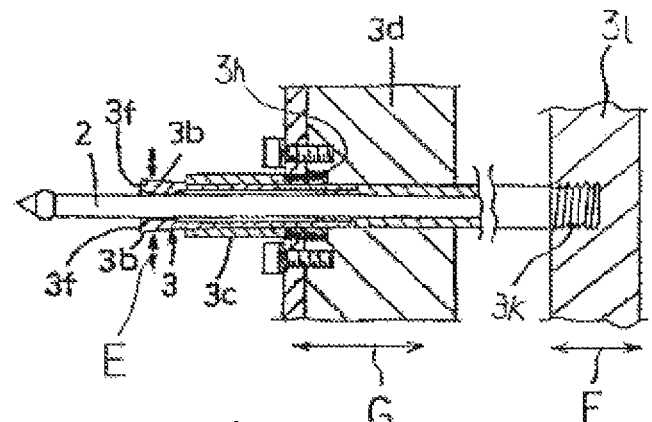
FIG. 2 illustrates an embodiment of the heat exchanger utilizing the tube-grasping body production apparatus of the present invention, where (a) is an enlarged cross-sectional diagram showing major components, (b) is an enlarged diagram showing major components, (c) and (d) are enlarged cross-sectional diagrams of some of major components when insert tubes are enlarged.
Figure 2B:
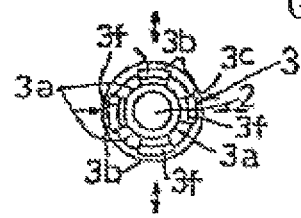
Figure 2C:
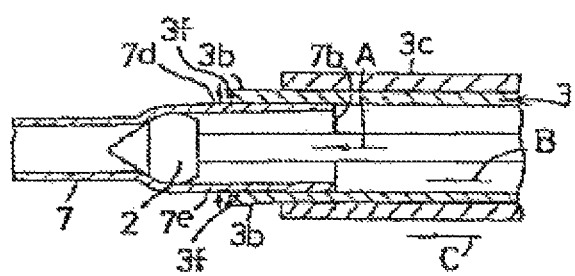
Figure 2D:
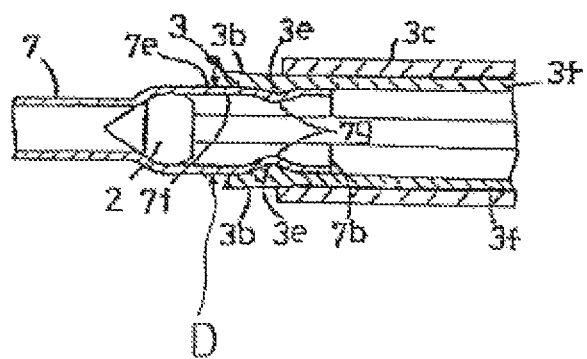

Next, from the opening 7b of each of said hairpin tubes 7, as shown in FIG. 2(c), by inserting (the arrow A) each of the tube-enlarging mandrels 2 by a prescribed depth, the enlargement portion 7d with a prescribed length is formed. Subsequently, by advancing (the arrow B) the tube-grasping body 3, by the tube-grasping body holder 3l, toward the circumferential surface 7e of said enlargement portion 7d, from the opening 7b of the hairpin tube 7, the tube-grasping body 3 is connected to the circumferential surface 7e, in the state where the exterior of said circumferential surface 7e is surrounded by the tube-contacting parts 3f.

Moreover, the tube-grasping body 3 with the above-mentioned multiple tube-contacting parts 3f capable of expanding and compressing are produced by means of the following processes. In other words, as will be described later, as shown in FIGS. 6 to 9: Facing the opening 7b of the hairpin tube 7, and the end part of the exterior tube grasping body 3 of the tube-enlarging mandrel 2, in addition to the tube-grasping body 3 having a total length of the predetermined order positioned at the opening 7b side of the tube, by cutting, at a fixed depth, the interior of the above-mentioned exterior tube grasping body 3 at one end rather than the other end, an inner diameter smaller than the inner diameter is formed in the tube-grasping body 3, which has been cut, at one end near the inside of the exterior tube grasping body 3, and a swelling part 3z that bulges in the axial direction is formed;

Before forming the said swelling parts 3z or after forming swelling parts 3z, at the end-line 3o of one end of the tube-grasping body 3, on the peripheral surface of the corresponding tube 7, the slope 3m inclined in a direction that extends toward the opening 7b of the tube 7 is formed;

To form a freely scaled and a plurality of tube-contacting parts 3f with bumps 3e in a radial direction crossing the longitudinal direction of the tube 7 in the tube-grasping body 3, at the near side other than the end side of the tube-grasping body 3, by forming a plurality of slits 3a in a predetermined length at a prescribed width 3u along the longitudinal direction of the tube-grasping body 3, via said multiple slits 3a, the aforementioned swelling parts 3z are divided by the number of slits 3a, and multiple tube-contacting parts 3f having bumps 3e ejected through axial direction of the tube-grasping body 3 are formed.

By polishing or cutting the exterior surface of the tube-grasping body 3 before forming the slits 3a, a slope 3b is formed in the direction of the incline that extends toward the opening 7b of the corresponding tube 7. From these, in addition to producing a tube-grasping body 3 with a plurality of tube-contacting parts 3f, using either a roughly cone-shaped jig (not shown) indented in the direction from one end of the said tube-grasping body 3 to the other end, or a cylindrical jig (not shown) with multiple acute bumps that are to be inserted into slits 3a of each prescribed width 3u, in order to accurately unify all the degrees of inclination (tilt angle) of each slope 3b with each tube-contacting part 3f, the opening 7b of the tube 7 from a predetermined position respective to each slit 3a not only has the advantage of spreading evenly the expanded width 3x curved gradually and expanded to the prescribed width 3u towards the opening 7b of the tube 7, but also, the slope 3b, before forming the front slits 3a with the prescribed width 3u, the said tube-grasping body 3 is polished or cut on the outer peripheral surface, having the effect during polishing or cutting, of highly accurately forming a slope 3b on the outer peripheral surface of the tube-grasping body 3 in the absence of deflection while in the condition of being without slits 3a.

Therefore, via an indentation on the aforementioned roughly cone-shaped jig (not shown) or a cylindrical jig (not shown) with a plurality of acute bumps, each of the slits 3a, at a prescribed point, in the direction of the opening 7b of the tube 7, spreads so as to have an expanded width 3x which is gradually curved larger the prescribed width 3u, thereby providing the tube-contacting part 3f on the exterior surface. Moreover, the degree of inclination of the slope 3b in a direction that extends toward the opening 7b of the tube 7, from the formation process of the predetermined position on the tube-contacting part 3f that is greater than the degree of inclination when the slits 3a are formed, the tube-grasping body 3 having a plurality of tube-contacting parts 3f with bumps 3e that protrude into the axial direction of the tube-grasping body 3 can be produced.

In the above-mentioned manufacturing processes, the process of forming the cut slope 3m, which can be formed at any point before the process of forming a plurality of prescribed width 3u slits 3a at a predetermined length in the longitudinal direction of the tube-grasping body 3, is to cut, at a prescribed depth, the inside of the said tube-grasping body 3 from the other of the end tube-grasping body 3 to the aforementioned end side. Needless to say, it is not a problem if this is before or after the process that, at one end near the inner tube-grasping body 3, forms the swelling part 3z that bulges in the axial direction of the tube-grasping body 3, which is formed with an inner diameter smaller than the inner diameter of the cut tube-grasping body 3.

Next, if the guide-pipe 3c is moved (the arrow C), by the guide-pipe holder 3d, in the same direction of the movement of the tube-enlarging mandrel 2, the guide-pipe 3c presses the slope 3b while sliding along a larger slope which has been formed on the exterior surface of each of said tube-contacting parts 3f, and which is slanted more pronouncedly in the widening direction toward the opening 7b of the corresponding tube 7. Thus, the diameter between each of the tube-contacting parts 3f is reduced in the axial direction of the tube-enlarging mandrel 2, by the space isolation of the prescribed width 3*u* of each of the slits 3*a*. As a result, each of said tube-contacting parts 3*f* becomes tightly connected at its exterior to the guide-pipe 3*c*, and, therefore, each of said tube-contacting parts 3*f* becomes to firmly grasp and support the circumferential surface 7*e* of the enlargement portion 7*d* of the hairpin tube 7. With regard to the tube-grasping body 3, FIGS. 3-5 explain the functions through slits 3*a* of prescribed widths without first widening the gradually curved and expanded width 3*x* for the above-mentioned prescribed widths 3*u* facing the direction of the opening 7*b* of the said tube 7 from the predetermined position between slits 3*a*. Specially, as shown in FIG. 2(*d*), a bump 3*e* is formed at each of the tube-contacting parts 3*f* for pressing (the arrow D) the circumferential surface 7*e* of said enlargement portion 7*d* (though the bump explained in FIG. 2(*d*) is little different in its shape from the bump 3*e* in FIGS. 3-5, their functions are the same), at the position where each of the tube-contacting parts meets the enlargement portion 7*d* of the hairpin tube 7, in order to build up the extruded-part 7*g* extruding from the interior circumferential surface 7*f* of said hairpin 7, in the axial direction of the tube-enlarging mandrel 2. Thus, the circumferential surface 7*e* of the enlargement portion 7*d* becomes more firmly grasped and supported. Therefore, it is possible to surely set the reference location of the opening 7*b* during the enlargement process. Next, from this state, if said tube-enlarging mandrel 2 is moved toward the hairpin part 7*c* of the hairpin tube 7, both of the hairpin part 7*c* and the opening 7*b* are supported. Thus, it is possible to keep shrinkage of the entire length of the hairpin tubes 7 at a minimum, and it is also possible to produce a high quality heat exchanger having higher precision.

Figure 3A:
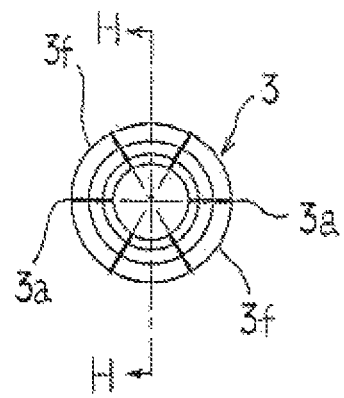
FIG. 3 illustrates the status of the slits of the tube-grasping body used in the heat exchanger production apparatus of the present invention, before the slits are opened, wherein (a) is a front view and (b) is a cross-sectional diagram along the H-H line shown in (a).
Figure 3B:
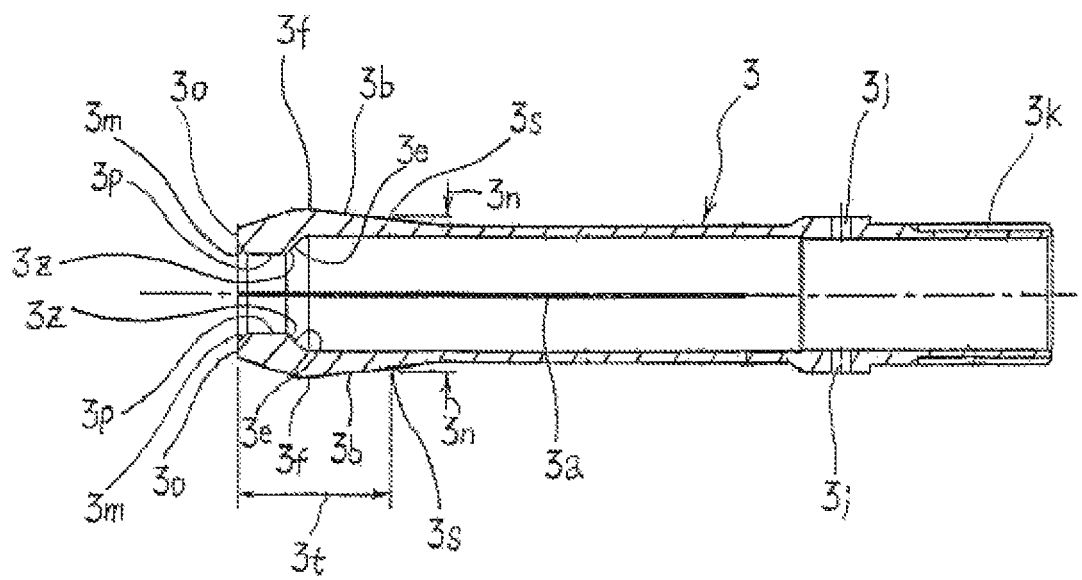
Figure 4A:
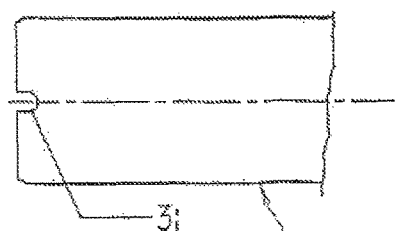
FIG. 4 illustrates the guide-pipe used in the heat exchanger utilizing the tube-grasping body production apparatus of the present invention, where (a) is an enlarged diagram, (b) is a front view, and (c) is a cross-sectional diagram along the I-I line shown in (b).
Figure 4B:
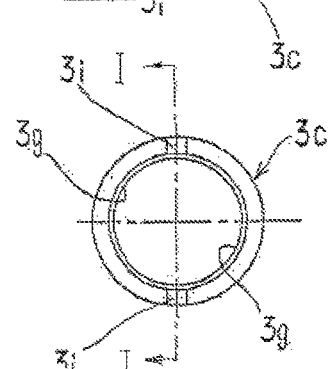
Figure 4C:
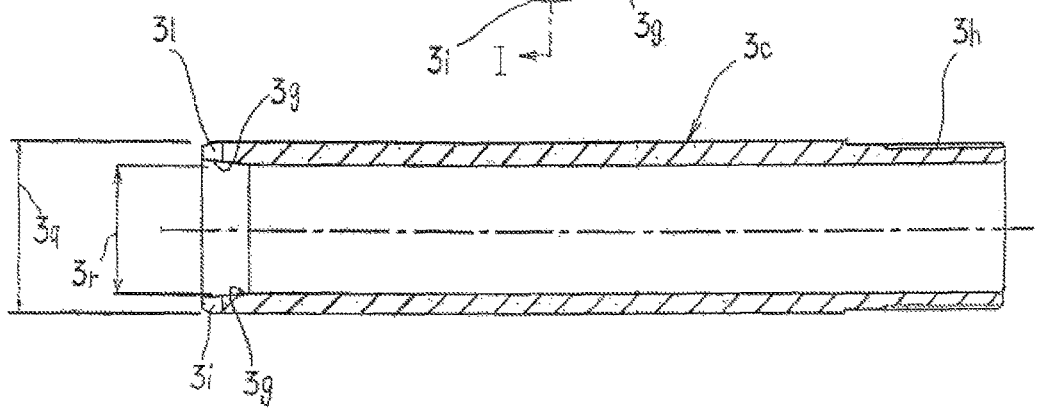
Figure 5A:
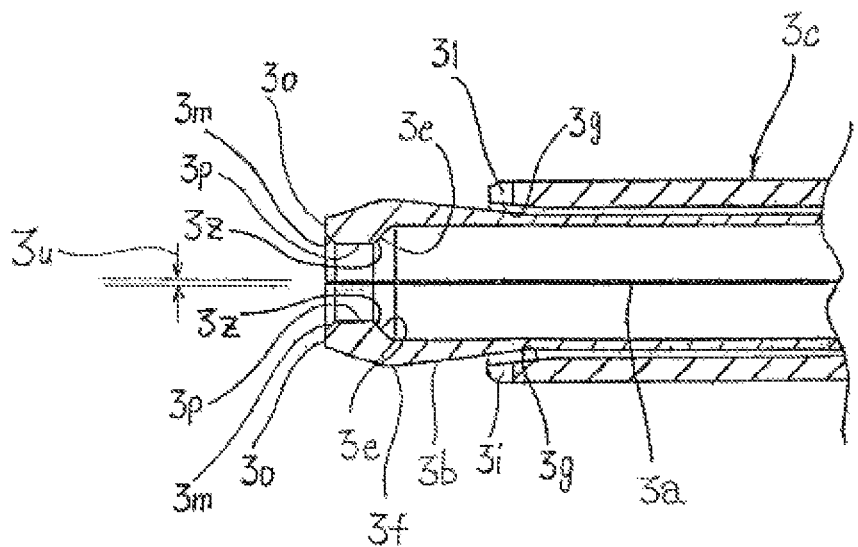
FIG. 5 illustrates the status of the slits of the tube-grasping body used in the heat exchanger production apparatus of the present invention, before the slits are opened, wherein (a) is a cross-sectional diagram before the insert tube is grasped, and (b) is a cross-sectional diagram after the insert tube is grasped.
Figure 5B:
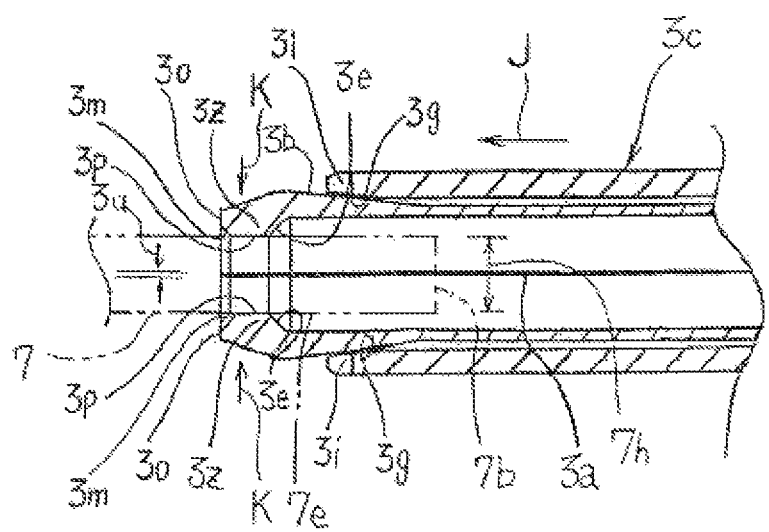

Also, when producing a heat exchanger where the gap between branches of the insert tube or the gap between neighboring hairpin tubes is significantly reduced, since the heat exchanger production apparatus 1 having the tube-grasping body 3 and the guide-pipe 3*c* indicated in FIGS. 3~5 is configured by the following conditions wherein the tube-grasping body is also connectable at the exterior of a tube-enlarging mandrel 2, for moving back and forth, along said tube-enlarging mandrel 2 which is penetrable from the opening 7*b* of a tube 7 inserted into a heat radiating fin 6 of a heat exchanger 5;

the tube-grasping body is also equipped with a plurality of tube-contacting parts 3*f*, capable of radially expanding or axially compressing in the cross direction of the longitudinal length of said tube 7;

the tube-grasping body is also equipped with slopes 3*b* slanting gradually in the widening direction toward the opening 7*b* of the corresponding tube, wherein by tilting radially from a predetermined position being formed on the outer surface, each of the slopes 3*b* is formed bigger on the exterior surface of each of said tube-contacting parts 3*f*;

the tube-grasping body is also equipped with a sliding means which radially expands or axially compresses each of said tube-contacting parts 3*f*, by sliding back and forth in the longitudinal direction of the tube, along said slopes 3*b* of the tube-contacting parts 3*f*;

a bump 3*e* is formed to extrude from the interior surface of each of said tube-contacting parts 3*f*, at the side of the opening 7*b*, in the axial direction of the tube 7;

a slope 3*m*, which has a straight or curved sloping side, is formed at said bump 3*e*, and slanted in the widening direction, from the summit 3*p* of the bump 3*e*, toward the opening 7*b* of the tube 7 facing the end-line 3*o* of the tube-contacting part 3*f*, in order to prevent said opening 7*b* from being deformed by collision of the bump 3*e* with the opening 7*b* of the tube 7 when the opening 7*b* of the tube 7 is connected at its exterior to the tube-contacting parts 3*f*;

a slope 3*g*, which has a straight or curved sloping side, is formed on the interior circumference of said guide-pipe 3*c* at its end side, and slanted in the widening direction toward the opening 7*b* of the corresponding tube 7, in order to reduce the sliding abrasion against each of the slopes 3*b* formed on the exterior surface of each of said tube-contacting parts 3*f*; and said slope 3*b* is also formed, on the exterior surface of each of the tube-contacting parts 3*f* of said tube-grasping body 3, at such a position that the slope 3*b* is not allowed to reach the end-line 3*o* of each of said tube-contacting parts 3*f*;

even if the diameter of the hairpin tube 7 in a heat exchanger 5 being enlarged is different according to the spec of the heat exchanger 5, for example, as shown in FIG. 5, by advancing the tube-grasping body 3, by the tube-grasping body holder 3*l* (not shown in the figure), toward the enlargement portion 7*d* of the tube 7 having a reference diameter of a prescribed tube diameter 7*h*, the tube-grasping body 3 becomes connected to the exterior of said tube 7. Then, by advancing said guide-pipe 3*c* (the arrow J), by the guide-pipe holder 3*c* (not shown in the figure), toward the opening 7*b* of the tube 7, each of tube-contacting parts 3*f* of said tube-grasping body 3 becomes to grasp the enlargement portion 7*d* of the tube 7 with a prescribed diameter 7*h*, by shrinking (the arrow K) of the diameter of each of tube-contacting parts 3*f* of said tube-grasping body 3, through the space distance of the slits 3*a* which are formed between said tube-contacting parts 3*f*, and which are of prescribed widths 3*u*. Also, the bumps 3*e*, which are formed at said tube-contacting parts 3*f*, press the circumferential surface 7*e* of the enlargement portion 7*d* and build up the extruded-parts 7*g* (not shown in the figure) extruding in the axial direction of the tube 7. Thus, the tube-contacting parts become to firmly grasp and support the tube, and, therefore, it is possible to accurately set the reference point of the opening 7*b* during the enlarging process, in order to produce a high precision heat exchanger by the higher precision enlarging process. Also, even if the gap between branches of the hairpin tube 7 or the gap between neighboring hairpin tubes is significantly reduced comparing to the prior arts, since the slope 3*b* is formed, on the exterior surface of each of the tube-contacting parts 3*f* of said tube-grasping body 3, at such a position that said slope 3*b* is not allowed to reach the end-line 3*o* of each of said tube-contacting parts 3*f*, during the phase where the diameter of each of the tube-contacting parts 3*f* is being reduced, shrinking of the diameter of each of the tube-contacting parts 3*f*, which is caused by the movement of the guide-pipe 3*c* toward the opening 7*b*, can be stopped before said guide-pipe 3*c* reaches the end-line 3*o* of the tube-contacting parts 3*f*.

Thus, when the exterior diameter 3*q* of the guide-pipe 3*c*, which is being connected at the exterior of the tube-grasping body 3 having the tube-contacting parts 3*f*, is determined as the reference diameter (the interior diameter 3*r* of the guide-pipe 3*c* when viewed from itself), the exterior diameter 3*n* measured between summits of the slopes 3*b* of the opposing tube-contacting contacting parts 3*f* which are faced each other, and whose diameter is being reduced during the enlargement through the slits 3*a*, it is possible to set the enlargement-occurring point 3*s*, where the diameter of the tube-contacting parts 3*f* becomes to be the exterior diameter 3n during the compression in the diameter of the tube-contacting parts 3f, at the location 3t, the location shifted from the end-line 3o of said tube-contacting parts 3f toward the side of the opening 7b, the opposite side of said end-line 3o of the tube-contacting part. Thus, it is possible to decrease the interior diameter 3r of the guide-tube 3c by the distance shifted. As a result, the exterior diameter 3q of the guide-pipe 3c is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3c whose diameter 3q has been decreased, from being hit by each of the neighboring guide-pipe 3c, when the opening 7b of each of straight tubes or hairpin tubes is being connected at its exterior by the tube-contacting parts of the tube-grasping body 3 equipped with said guide-pipe 3c. Thus, it is possible to provide an effect of well producing the heat exchanger 5, wherein the gap between insert tubes is significantly reduced for the following example cases: the case where the heat exchanger is downsized (downsized insert tubes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, relating to FIGS. 3-5, if the slope 3b is formed on the exterior surface of each of said tube-contacting parts 3f of said tube-grasping body 3, at the rear side of the bump 3e which is formed at the side of the opening 7b on the interior surface of each of said tube-contacting parts 3f, the opposite side of the end-line 3o of the tube-contacting part 3f, in such a way that said slope 3b is not allowed to reach the end-line 3o of the tube-contacting part 3f of said tube-grasping body 3, it is possible to set the enlargement-occurring point 3s, where the diameter of the tube-contacting parts 3f becomes to be the exterior diameter 3n during the compression in the diameter of the tube-contacting parts 3f, at the location 3t, the farthermost location shifted from the end-line 3o of said tube-contacting parts 3f toward the side of the opening 7b, the opposite side of said end-line 3o of the tube-contacting part 3f. Thus, it is possible to minimize the interior diameter 3r of the guide-tube 3c by the distance shifted. As a result, the exterior diameter 3q of the guide-pipe 3c can be set at a minimum. Also, even if the gap between branches of the hairpin tube 7, the gap between each of the neighboring hairpin tubes 7, or the gap between each of the straight insert tubes is extremely reduced comparing to the prior arts, it is possible to prevent the guide-pipe 3c whose diameter 3q has been minimized, from being hit by each of the neighboring guide-pipe 3c, when the opening 7b of each of straight tubes or hairpin tubes is being connected at its exterior by the tube-contacting parts of the tube-grasping body 3 equipped with said guide-pipe 3c. Thus, it is possible to provide an effect of best producing the heat exchanger 5, wherein the gap between insert tubes is extremely reduced for the following example cases: the case where the heat exchanger is extremely downsized (extremely downsized insert tubes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Also, according to the tube-grasping body 3 configured as above, if said tube-grasping body 3 is equipped with a tool-joining part 3j for joining or disjoining said tube-grasping body 3, to or from the tube-grasping body holder 3l, it is possible to enable quick change of the tube-grasping body 3 which has been worn, by simply connecting a tool, such as a driver, to the tool-joining part 3j, and by rotating said tool. Also, it is possible to provide an effect of enabling to change the tube-grasping body 3 easily, firmly, and within a very short time, perfectly adapting to the gap between branches of the hairpin tube 7, the gap between the neighboring hairpin tubes 7, or the gap between or the diameter of each of the neighboring straight insert tubes.

Also, relating to the guide-pipe 3c configured as above, if said guide-pipe 3c is equipped with a tool-joining part 3i for joining or disjoining the guide-pipe 3c, to or from the guide-pipe holder 3d, it is possible to enable quick change of the guide-pipe 3c which has been worn, by simply rotating a tool, such as driver, to the tool-joining part 3i, and by rotating said tool. Also, it is possible to provide a special effect of enabling to change the guide-pipe 3c easily, firmly, and within a very short time, perfectly adapting to the gap between branches of the hairpin tube 7, the gap between the neighboring hairpin tubes 7, or the gap between or the diameter of each of the neighboring straight insert tubes.

Next, relating to the tube-grasping body of the current invention for grasping an insert tube in a heat exchanger, an embodiment of the tube-grasping-body equipped with the tube-contacting parts 3f is explained, wherein the slits are formed for building up said contacting parts 3f, and the width of each of the slits is gradually curve and spread from a prescribed width to an expanded width, from a prescribed location of the slit.

Figure 6A:
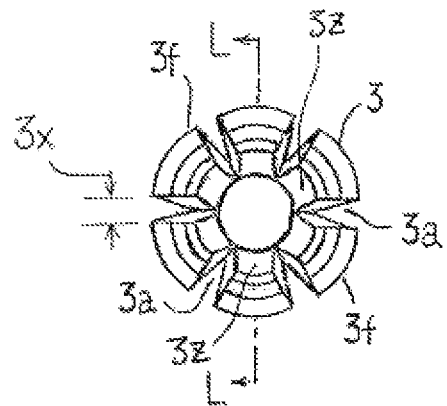
FIG. 6 illustrates the status of the slits of the tube-grasping body used in the heat exchanger production apparatus of the present invention, after the slits are opened, wherein (a) is a front view, and (b) is a cross-sectional diagram along the L-L line shown in (a).
Figure 6B:
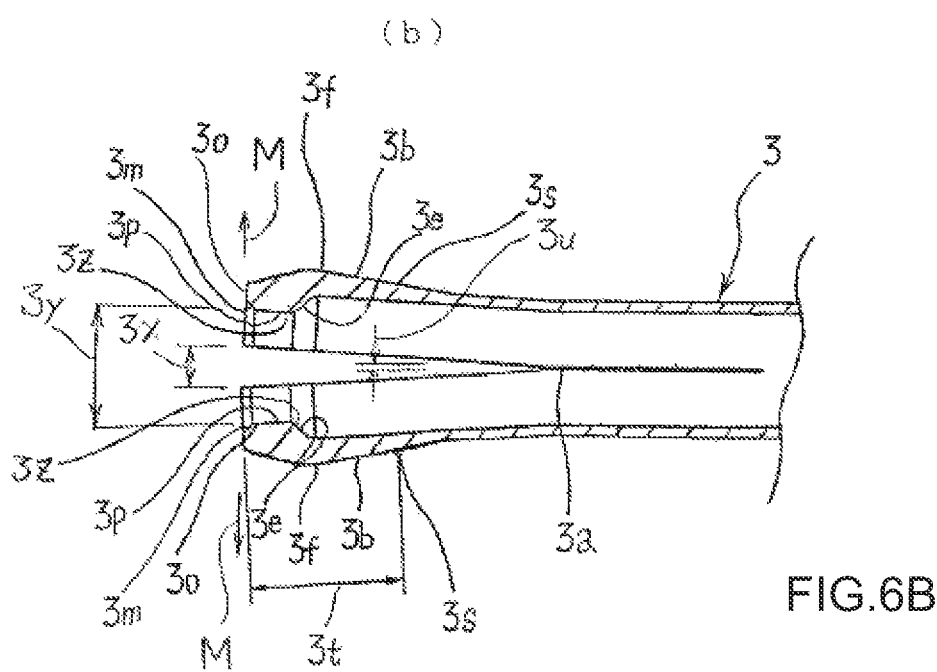

In FIG. 6, in a heat exchanger production apparatus to embody the heat exchanger production method explained above, utilizing the tube-grasping body 3 which is also connectable at the exterior of a tube-enlarging mandrel 2, for moving back and forth, along said tube-enlarging mandrel 2 which is penetrable from the opening 7b of a tube 7 inserted into a heat radiating fin 6 of a heat exchanger 5;

which is also equipped with a plurality of tube-contacting parts 3f, capable of radially expanding or axially compressing in the cross direction of the longitudinal length of said tube 7;

which is also equipped with slopes 3b which formed beforehand and has redetermined slope, slanting gradually in the widening direction toward the opening 7b of the corresponding tube, wherein each of the slopes 3b is formed a bigger slant by curve and spread the width of each of the slits the above, and formed on the exterior surface of each of said tube-contacting parts 3f;

which also radially expands or axially compresses each of said tube-contacting parts 3f, by a sliding means which moves back and forth in the longitudinal direction of the tube, along said slopes 3b of the tube-contacting parts 3f; and which is also characterized by the configuration wherein said tube-contacting parts 3f, capable of radially expanding or axially compressing, are formed and separated by a plurality of slits 3a which are of prescribed widths 3u, and which are formed in the longitudinal direction of the tube-grasping body 3, the same direction of the movement of the tube-enlarging mandrel 2;

if the width of each of said slits 3a is gradually increased from said prescribed width 3u to an expanded width 3x, from a prescribed location toward the opening 7b of said tube 7, when the side of the opening 7b of the tube 7 is being connected at its exterior to the tube-contacting parts 3f, it is possible to greatly expand (the arrow M) the maximum open diameter 3y and the dynamic range (space distance) of each of the tube-contacting parts 3f (said dynamic range is measured from the difference in diameters between the expansion and the compression states), through the plural slits 3a which are separated by a prescribed width 3u, and which are formed in the longitudinal direction of the tube-grasping body 3 to build up said tube-contacting parts 3f.

Figure 7A:
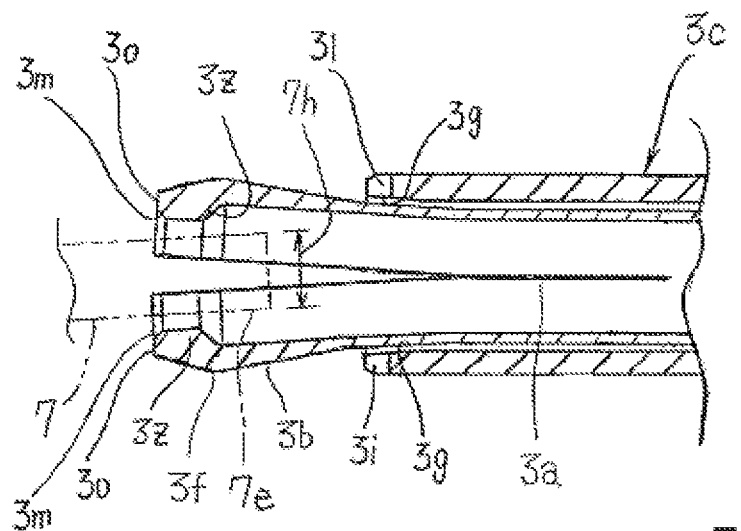
FIG. 7 illustrates the status of the slits of the tube-grasping body used in the heat exchanger production apparatus of the present invention, after the slits are opened, wherein (a) is a cross-sectional diagram when an insert tube is grasped if the axis of the insert tube is skewed off from the axis of the tube-grasping body, and (b) is a cross-sectional diagram when an insert tube with a large diameter is grasped.

Therefore, as shown in FIG. 7(a), for example, even if the axis of the enlargement portion 7d of the tube 7 having a prescribed diameter 7h is away, by a small degree, relative to the longitudinal direction of the tube-enlarging mandrel, from the axis of the tube-grasping body 3, it is possible, by each of the tube-contacting parts 3f whose maximum open diameter 3y and the dynamic range (the dynamic range being measured from the difference in diameters between the expansion and the compression states) have been greatly expanded, to provide the effect of surely preventing one end from being deformed or transformed by collision of the end-line of the tube-contacting part 3f and the opening 7b of the tube 7.

Figure 7B:
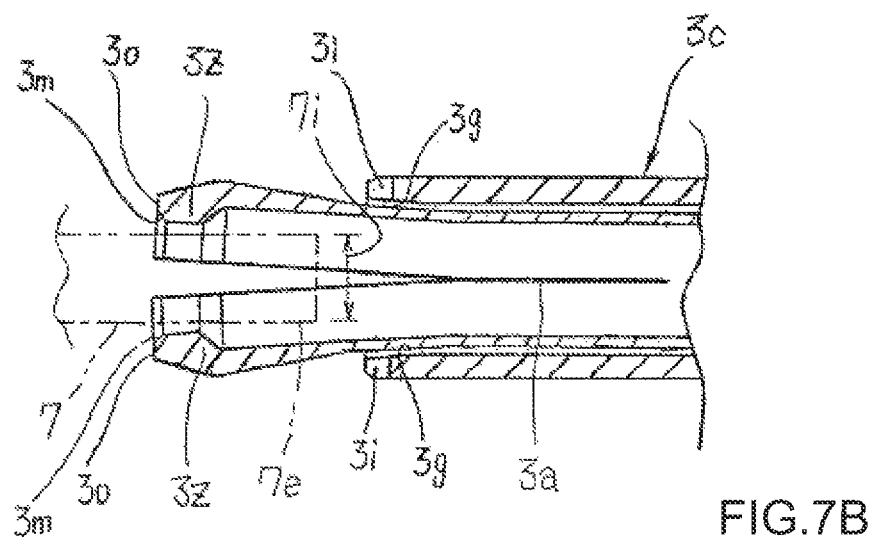

Also, as shown in FIG. 7(b), if the width of each of said slits 3a of the tube-grasping body 3 is gradually increased from said prescribed width 3u to an expanded width 3x, from a prescribed location toward the opening 7b of said tube 7, it is possible, by each of the tube-contacting parts 3f whose maximum open diameter 3y and the dynamic range have been expanded (the dynamic range is measured from the difference between diameters of the expansion and compression states), to provide the effect of surely preventing one end from being deformed or transformed by collision of the end-line of the tube-contacting part 3f and the opening 7b of the tube 7 even if the exterior diameter 7i of the enlargement portion 7d at the side of the opening 7b of the tube 7 becomes about the same size (bigger diameter than the reference diameter of a prescribed diameter 7h) as the interior diameter of the tube-grasping body 3 itself or the interior diameter between the tube-contacting parts 3f (the interior diameter between the bumps, if bumps are formed).

Also, relating to the tube-grasping body 3 configured above, if each of said tube-contacting parts 3f, capable of radially expanding or axially compressing, is bent to form a smooth radiating curve with or without a edge on the bent portion, in the radial direction, from a prescribed location of said slit 3a toward the opening 7b of the tube 7, in order to gradually curved and expand the width of each of said slits 3a from the prescribed width 3u to the expanded maximum width 3x, from a prescribed location, toward the opening 7b of the tube 7, it is possible to increase durability as a component, by smoothly sliding the guide-pipe 3c along said slope 3b which is formed on each of the tube-contacting parts 3f with or without a curved edge on its sloping side, even if the maximum open diameter 3y and the dynamic range (said dynamic range is the difference in diameters between the expansion and the compression states) of each of the tube-contacting parts 3f are maximally expanded, through the space distance of the expanded widths 3x, the width expanded from the prescribed width 3u of the slit 3a. Also, it is possible to provide the effect of easily and firmly adjusting to maximize the dynamic range of each of the tube-contacting parts 3f, from the maximum open diameter 3y to the minimum diameter (till the so-called grasping operation, though the shrinkage in the axial direction in each of the tube-contacting parts 3f is different, according to the exterior diameter of the enlargement portion of the tube), in proportion to the sliding distance of the guide-pipe 3c.

Also, relating to the tube-grasping body 3 configured as above, since a bump 3e is formed to extrude from the interior surface of each of said tube-contacting parts 3f, at the side of the opening 7b, in the axial direction of the tube 7; and a slope 3m, which has a straight or curved sloping side, is formed at said bump 3e, and slanted in the widening direction, from the summit 3p of the bump 3e, toward the opening 7b of the tube 7 facing the end-line 3o of the tube-contacting part 3f, in order to prevent said opening 7b from being deformed by collision of the bump 3e with the opening 7b of the tube 7 when the opening 7b of the tube 7 is connected at its exterior to the tube-contacting parts 3f, even if the opening 7b of the tube 7 contacts the bump 3e of each of the tube-contacting parts 3f, it is possible to enable the bump 3e to slide smoothly following the opening 7b of the tube 7, by the slope 3m with the sloping side being straight or curved, and it is also possible to provide the effect of surely preventing the opening 7b of the tube 7 and the tube-contacting parts 3f having the bump 3e, from being deformed or transformed.

Also, relating to the tube-grasping body 3 and the guide-pipe 3c, configured as above, since a slope 3g, which has a straight or curved sloping side, is formed on the interior circumference of said guide-pipe 3c at its end side, and slanted in the widening direction toward the opening 7b of the corresponding tube 7, in order to reduce the sliding abrasion against each of the slopes 3b formed on the exterior surface of each of said tube-contacting parts 3f; and said slope 3b is also formed, on the exterior surface of each of the tube-contacting parts 3f of said tube-grasping body 3, at such a position that the slope 3b is not allowed to reach the end-line 3o of each of said tube-contacting parts 3f, under the condition where the gap between branches of the hairpin tube or the gap between the neighboring hairpin tubes is significantly reduced comparing to the prior arts, shrinking of the diameter of each of the tube-contacting parts 3f, which is caused by the movement of the guide-pipe 3c toward the opening 7b, can be stopped before said guide-pipe 3c reaches the end-line 3o of the tube-contacting parts 3f during the shrinking operation of the diameter in each of the tube-contacting parts 3f. Thus, when the exterior diameter 3q of the guide-pipe 3c, which is connected at the exterior of the tube-grasping body 3 having the tube-contacting parts 3f, is determined as the reference diameter (the interior diameter 3r of the guide-pipe 3c when viewed from itself), the exterior diameter 3n measured between the summits of the slopes 3b of the opposing tube-contacting parts 3f which are faced each other, and whose diameter is being reduced during the enlargement through the slits 3a, it is possible to set the enlargement-occurring point 3s, where the diameter of the tube-contacting parts 3f becomes to be the exterior diameter 3n during the compression in the diameter of the tube-contacting parts 3f, at the location 3t, the location shifted from the end-line 3o of said tube-contacting parts 3f toward the side of the opening 7b, the opposite side of said end-line 3o of the tube-contacting part 3f. Thus, it is possible to decrease the interior diameter 3r of the guide-tube 3c by the distance shifted. As a result, the exterior diameter 3q of the guide-pipe 3c is automatically reduced. Also, even if the gap between branches of the hairpin tube 7, the gap between each of the neighboring hairpin tubes 7, or the gap between each of the straight insert tubes is significantly reduced comparing to the prior arts, it is possible to prevent the guide-pipe 3c whose diameter 3q has been decreased, from being hit by each of the neighboring guide-pipes 3c, when the opening 7b of each of straight tubes or hairpin tubes is being connected at its exterior by the tube-contacting parts of the tube-grasping body 3 equipped with said guide-pipe 3c. Thus, it is possible to provide an effect of well producing the heat exchanger 5, wherein the gap between insert tubes is significantly reduced for the following example cases: the case where the heat exchanger is downsized (downsized insert pipes, etc.) due to reasons of saving in energy or cost, the case where straight tubes or hairpin tubes 7 are inserted in a zigzag pattern, and the case where straight tubes or hairpin tubes are inserted in multiple columns such as columns of 3, 4, or etc.

Figure 8:
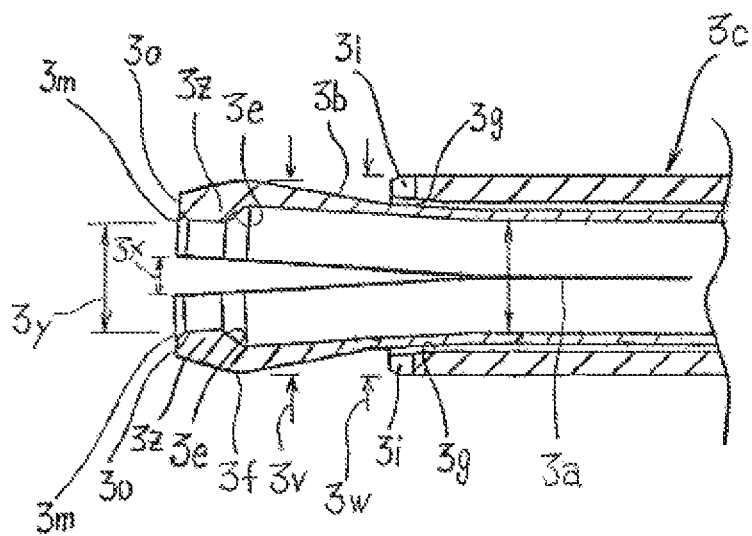
FIG. 8 illustrates an example embodiment of the slits of the tube-grasping body used in the heat exchanger production apparatus of the current invention, after the slits are opened.

Also, as shown in FIG. 8, relating to said tube-grasping body 3, since a sliding means is provided by the guide-pipe 3c, which moves back and forth in the longitudinal direction of the tube, along said slopes 3b of the tube-contacting parts 3f; and the maximum exterior diameter 3v of said tube-grasping body 3 is set below the exterior diameter 3w of the guide-pipe 3c, wherein the maximum exterior diameter 3v is formed and configured by the opposing tube-contacting parts 3f facing each other in order to build up said slopes 3b, it is possible to accommodate said tube-contacting parts 3f, which are formed and separated by the slits 3a with a prescribed width 3u, within the exterior diameter 3w of the guide-pipe 3c, in the state where the maximum open diameter 3y and the dynamic range (the dynamic range is the difference in diameters between the expansion and compression states) of each of the tube-contacting parts 3f are expanded through expansion of each of the widths of the slits 3a to a larger value than a prescribed width 3u. Therefore, it is possible to provide the effect of surely preventing collision by neighboring tube-contacting parts 3f, even for the following cases:

the case where the space between each of the guide-pipes 3c is fully taken up, corresponding to the case where the gap between branches of the hairpin tube 7, or the gap between each of neighboring hairpin tubes 7, or the gap between each of straight tubes being inserted, is significantly reduced comparing to the prior arts, and the case where the enlargement portion 7d at the side of the opening 7b of the tube 7 is being grasped, by each of the tube-contacting parts 3f of each of the tube-grasping bodies 3, which is accommodated in the interior of each of the neighboring guide-pipes 3c.

Figure 9:
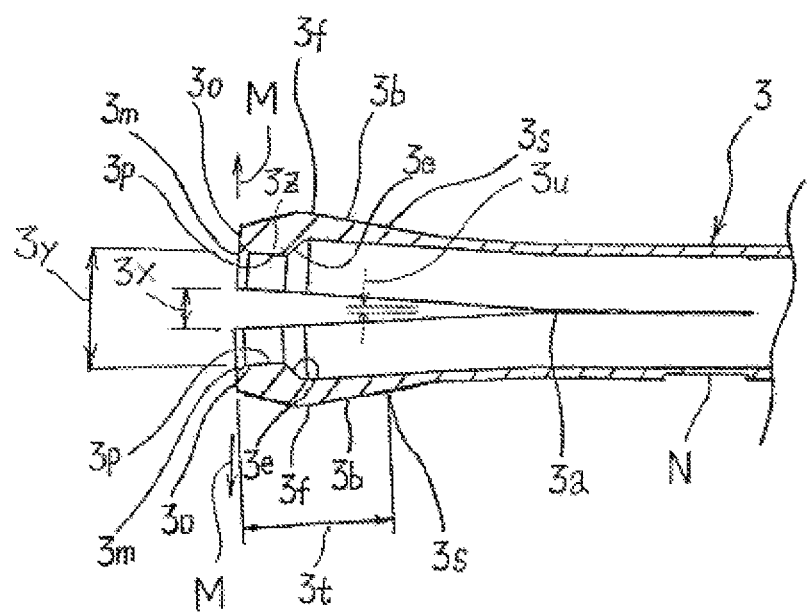
FIG. 9 illustrates another example embodiment of the slits of the tube-grasping body used in the heat exchanger production apparatus of the current invention, after the slits are opened.

Also, as indicated in FIG. 9, at the tube-grasping body 3 with said tube-contacting parts 3f, if a limiting means such as a groove or a concavity (not shown in the figure) or a convexity (not shown in the figure) is installed when said tube-grasping body 3 is held by the tube-grasping body holder 3l, in order to limit (limiting rotation of the tube-grasping body holder 3l) the location of the radial expansion or the axial compression of the tube-contacting parts 3f of the tube-grasping body 3 (though not shown in the figure, parts which correspond to the limiting means of the tube-grasping body 3, and which are fixed at the tube-grasping holder 3l or other components, are contacted and limited by such limiting means), it is possible to support and keep the tube-grasping body 3 at such a place that none of the tube-grasping body holders 3l is allowed to rotate to contact the tube-contacting parts 3f of neighboring tube-grasping bodies 3, when each of the tube-contacting parts 3f of the tube-grasping body 3 is radially increased in its diameter, even if the gap between each of the end-plates (not shown in the figure) which is installed near the enlargement portion 7d of the tube 7 being inserted into the heat radiating fin 6 in a heat exchanger 5, or the gap between each of the neighboring insert tubes 7, is reduced. As a result, it is possible to provide the effect of surely avoiding deformation by collision of each of the tube-contacting parts 3f of the neighboring tube-grasping bodies 3, or deformation of said end-plate of the heat exchanger 5 by said tube-contacting parts 3f.

If the width of each of said slits 3a is gradually curved and increased from said prescribed width 3u to an expanded width 3x, from a prescribed location toward the opening 7b of said tube 7, when the side of the opening 7b is being connected at its exterior to the tube-contacting parts 3f, it is possible to expand the maximum open diameter 3y and the dynamic range of each of the tube-contacting parts 3f (the dynamic range is measured from the difference in diameters between the expansion and the compression states), through the plural slits 3a which are separated by a prescribed width 3u, and which are formed in the longitudinal direction of the tube-grasping body 3 to set up said tube-contacting parts 3f; when producing a heat exchanger by the heat exchanger production method comprising:

the first process wherein an enlargement portion having a prescribed length is formed, by inserting a tube-enlarging mandrel by a prescribed depth, from the opening of an insert tube being inserted into a heat radiating fin of a heat exchanger;

the second process wherein the exterior of said enlargement portion is surrounded and connected, by the tube-grasping body wherein said tube-contacting parts, capable of radially expanding or axially compressing, are formed and separated by a plurality of slits which are of prescribed widths, and which are formed in the longitudinal direction of the tube-grasping body, the same direction of the movement of the tube-enlarging mandrel; and the width of each of said slits is gradually increased from said prescribed width to an expanded width, from a prescribed location toward the opening of said tube;

the third process wherein the circumferential surface of the enlargement portion of the tube is firmly grasped and supported by tube-contacting parts, as the diameter of each of the tube-contacting parts is reduced in the axial direction to gradually reduce the expanded width which has been expanded from a prescribed width from a prescribed position of the slit, by a sliding means pressing the slopes of the tube-contacting parts which is made steeper than slope of the slit, while sliding, toward the opening of the corresponding tube, along the same slopes which are slanted in the widening direction toward the opening of the tube; and the forth process wherein, in the state where the circumferential surface of the enlargement portion of the tube is firmly grasped and supported by the tube-contacting parts, the tube-enlarging mandrel is further inserted into the tube to join the heat radiating fin and the tube together.

Thus, as explained in FIG. 7(a) above, for example, even if the axis of the enlargement portion 7d of the said tube 7 having a reference diameter of a prescribed tube diameter 7h is away, by a small degree, relative to the longitudinal direction of the tube-enlarging mandrel 2, from the axis of the tube-grasping body 3, it is possible, by each of the tube-contacting parts 3f whose maximum open diameter 3y and the dynamic range (the dynamic range is measured from the difference of the diameters between the expansion and compression states) have been greatly expanded, to provide the effect of surely preventing one end from being deformed or transformed by a collision of the end-line of the tube-contacting part 3f and the opening 7b of the tube 7.

Also, relating to the case where a heat exchanger is produced by the method above, as shown in FIG. 7(b), if the width of each of said slits 3a of the tube-grasping body 3 is gradually increased from said prescribed width 3u to an expanded width 3x, from a prescribed location toward the opening 7b of said tube 7, it is possible, by each of the tube-contacting parts 3f whose maximum open diameter 3y and the dynamic range (the dynamic range is measured from the difference of the diameters between the expansion and compression states) have been expanded, to provide the effect of surely preventing one end from being deformed or transformed by collision of the end-line of the tube-contacting part 3f and the opening 7b of the tube 7, even if the exterior diameter 7i of the enlargement portion 7d at the side of the opening 7b of the tube 7 becomes about the same size (bigger than the reference diameter of a prescribed diameter 7h) as the interior diameter of the tube-grasping body 3 itself or the interior diameter between the tube-contacting parts 3f (the interior diameter between the bumps, if bumps are formed).

Figure 10A:
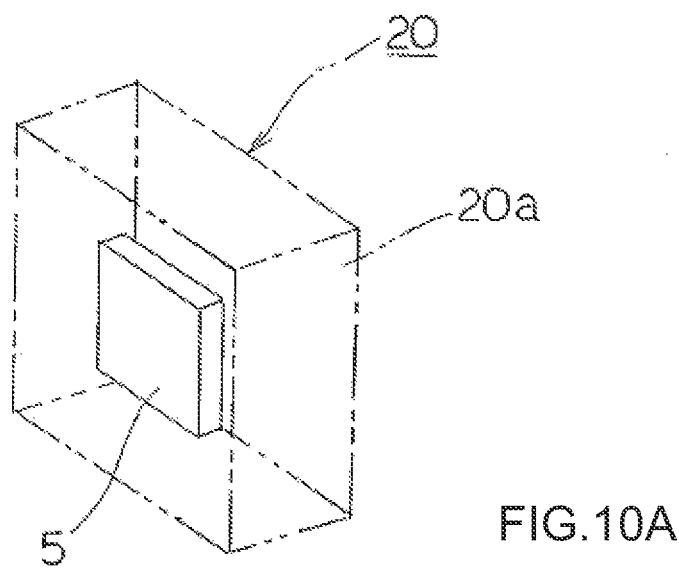
FIG. 10 illustrates an example embodiment of a product which is equipped with the heat exchanger utilizing the tube-grasping body, produced using the tube-grasping body used in the heat exchanger production apparatus of the current invention, wherein (a) is an air-conditioner having the heat exchanger and (b) is an outdoor unit having the heat exchanger to be used with an air-conditioner.
Figure 10B:
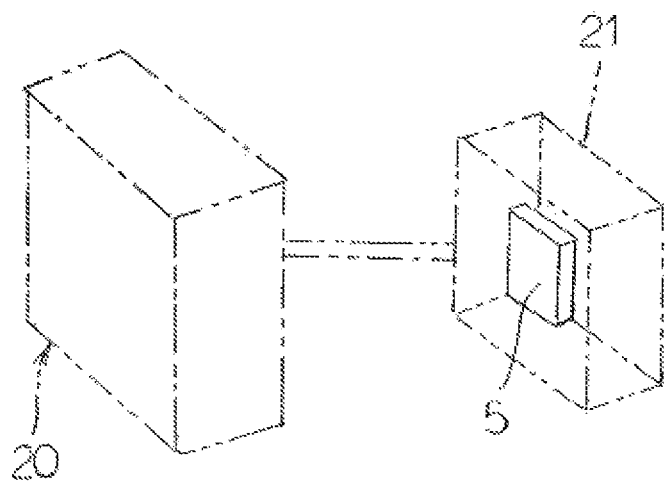

Thus, if a heat exchanger 5, produced by the method using the tube-grasping body, is placed in a prescribed casing 20a with various components such as an air blower (FIG. 10(a)), or, in an outdoor unit 21 used in an air conditioner 20 (FIG. 10(b)), the products adopting such a heat exchanger enables a decrease in logistics cost or product cost, due to the downsized heat exchanger due to the decrease in the tube diameter, or the gap between neighboring tubes.

Also, relating to the case where the heat exchanger, produced by the method of the current invention explained above, is used in an air conditioner 20 or in an outdoor unit 21 used in an air conditioner 20, it is not implied to exclude air conditioners such as a so-called centralized air conditioner which is referred to as either an air handling unit or a fan coil unit, or a so-called individual air conditioner which is referred to as either a package air conditioner or a room air conditioner. Thus, for any air conditioner using a heat exchanger, it is not implied to exclude anything such as its detailed configuration, the shape, the size, the system construction. Also, it does not exclude anything such as its use or sales area, if a heat exchanger produced by the method of the current invention is used in other various products.

Also, for an embodiment where tubes other than hairpin tubes are inserted, for example, for the case where multiple straight tubes (not shown in the figure) are inserted, it is not implied to limit anything such as the tube material, the shape, kinds, quantity, the insertion pattern, and etc.

Also, relating to the embodiment explained above, though a so-called vertical typed enlargement apparatus is explained, as an example of the heat exchanger production apparatus with the tube-grasping body 3 which is connected at its exterior to the guide-pipe 3c to enable the guide-pipe to slide along said tube-grasping body, it is not implied to exclude a so-called horizontal typed enlargement apparatus. Also, relating to the so-called vertical typed enlargement apparatus, it is not implied to exclude anything such as detailed configuration, kinds, characteristics, or etc., as well as the quantity of the tube-contacting parts, the quantity of the tube-grasping bodies or the tube-enclosing bodies, ways of arranging them, and their location of installation.

The manufacturing method of the tube-grasping body 3 according to the present invention enables fitting to the outside of the tube-enlarging mandrel 2, moreover, the process of cutting, at the end, at a prescribed depth, the interior of the said tube grasping body 3 at one end from the other end of the tube-grasping body 3 having a prescribed total length positioned at the opening 7b of the aforementioned tube 7, at one end near the interior of the tube-grasping body 3, an inner diameter smaller than the inner diameter of the tube-grasping body 3, which is cut, forms a swelling part 3z that bulges in the axial direction. After the swelling part 3z is formed, in a direction crossing the longitudinal direction of the tube 7 to the tube-grasping body 3, in order to form a plurality of tube-contacting parts 3f with expansions that move in a radial direction, along the longitudinal direction of the tube-grasping body 3 to the other side from the side, by forming a plurality of prescribed width 3u slits 3a at a predetermined length, via the aforementioned slits 3a, the aforementioned swelling parts 3z are divided into the number of slits 3a; the process thereby forms multiple tube-grasping bodies 3 having multiple bumps 3e which protrude into the axial direction of the tube-grasping body 3. By expanding each of the slits 3a in order to have a larger width dimension 3x that gradually curves and expands greater than the prescribed width 3u towards the direction of the opening 7b of the tube 7 from the predetermined location, it is provided on the exterior surface of the member 3f, moreover, in the direction spreading out from the opposite opening 7b of the tube 7, the inclined slopes 3b are formed at the contact member 3f at a greater inclination than the slopes 3b when the slits 3a are formed. Due to this process, because a tube-grasping body 3 having a tube-contacting part 3f with multiple bumps 3e which protrude into the axial direction of the tube-grasping body 3 is produced, the tube-grasping body 3 manufactured by this manufacturing method, when having externally connected a tube-contacting part 3f from the opening 7b of the tube 7, the maximum opening diameter 3y of the tube contact member 3f facing the tube opening 7b of the tube 7, and the scaling weight range between the maximum opening diameter of each tube 3y, in the direction of the tube-grasping body 3 to be formed, via the multiple slits 3a established with prescribed widths 3u, the maximum opening diameter 3y of the tube-contacting parts 3f and each of slits 3a from the scaling weight range, in the direction of the opening 7b of the aforementioned tube 7 at prescribed locations, enables partial enlargement in order to have a larger width 3x curved gradually increased to the prescribed width 3u. Therefore, even if the exterior diameter 7i of the enlargement portion 7d of the opening 7b of the tube 7 has become the same diameter substantially the (inner diameter of the bump between) the inner diameter of the tube abutting member 3f and between the inner diameter of the tube-grasping body 3 itself, and even if it is slightly inclined to be shifted from the axial direction of the tube-grasping body 3 axial direction of the enlargement portion 7d in the longitudinal direction of the mandrel along the longitudinal direction of the mandrel, then not only can deformation or damage be prevented for at least one opening 7b of the tube 7, when the tip of the tube-contacting member 3f is in contact through each tube-contacting part 3f obtained by expanding the scaling range and the amount of maximum opening size 3y, but this is provided through the number of tubes contacting member 3f by dividing the number of slits 3a of the swelling part 3z through the multiple slits 3a. Therefore, by cutting in line with the type and properties of the actual tube-grasping body 3, such as its bump size (height) and overall length (the length of the bumps 3e along the axial direction of the tube-grasping body 3), not only can there by the effects of fabrication formed simply by cutting to fit, but the said bumps 3e, when the tube-contacting part 3f is fitted from the opening 7b of the tube 7 due to the collision of the tube opening 7b of the tube 7 and bumps 3e, and a slope 3m sloping in a direction that extends toward the opening 7b of the tube 7 facing the end-line 3o of the tube-contacting part 3f from the summit 3p of bumps 3e, can prevent deformation. Therefore, even there is contact between the bumps 3e of the tube-contacting part 3f and the opening 7b of the tube 7, and the bumps 3e can be smoothly slide through the slope 3m in the opening 7b of the tube 7, with preparation of a tube-grasping body 3, it is possible to reliably prevent the deformation or damage of the opening 7b of the tube 7 and the tube-contacting part 3f which has bumps 3e that are excellent in this method

INDUSTRIAL APPLICABILITY

The current invention relates to a tube-grasping body for grasping an insert tube in a heat exchanger, heat exchanger production methods and apparatuses utilizing the tube-grasping body, and an air conditioner and/or an outdoor unit equipped with the heat exchanger produced by the methods and apparatuses; wherein the tube-grasping body enables the insert tube to be enlarged to connect to a heat radiating fin for producing a heat exchanger, still keeping the total length of insert tubes at an almost same level comparing, even after the insert tube is enlarged by inserting into each of through holes of heat radiating fins in heat exchangers overlaid in their multitudes; and said tube-grasping body prevents the opening of the tube and the end-line of each of the tube-contacting parts of the tube-grasping body, from being deformed or damaged by collision between them, and also firmly grasps the opening side of insert tubes sitting at the interior side in the heat exchanger, as well as the tubes sitting at the exterior side in the heat exchanger, in order to resolve all the problems occurring in the following example cases: the case where the gap between insert tubes is decreased to enable them to be inserted into a heat radiating fin in multiple columns such as columns of 3, 4, or etc., the case where the diameters of insert tubes being enlarged are different according to the spec of the heat exchanger, the case where the gap between each of straight tubes or hairpin tubes being inserted into said heat radiating fin is significantly decreased comparing to the prior arts, the case where the exterior diameter of the insert tube becomes about the same size as the interior diameter of the tube-grasping body itself or the interior diameter between the tube-contacting parts (the interior diameter between the bumps if bumps are formed on the interior surface of the tube-contacting parts), and the case where the axis of said enlargement portion is away, by some degree, relative to the direction of the longitudinal length of the tube-enlarging mandrel, from the axis of the tube-grasping body.

It is to be understood that the above-described embodiments are illustrative of only some of the many possible specific embodiments which can represent applications of the principles of the invention. Numerous and varied other arrangements can be readily devised by those skilled in the art without departing from the spirit and scope of the invention.

REFERENCE NUMERALS 1 an heat exchanger production apparatus
1a the main body
2 the tube-enlarging mandrel
3 the tube-grasping body
3a the slits
3b the slope at the tube-contacting part
3c the guide-pipe
3d the guide-pipe holder
3e the bump
3f the tube-contacting part
3g the slope at the guide-pipe
3h the bolt at the guide-pipe
3i the tool-joining part of the guide-pipe
3j the tool-joining part of the tube-grasping body
3k the bolt at the tube-grasping body
3l the tube-grasping body holder
3o the end-line of the tube-contacting part
3p the summit of the bump
4 the enclosing-body shifting device
5 the heat exchanger
6 the heat radiating fin
7 the hairpin tube (or the straight tube)

What is claimed is:

1. A production method for a tube-grasping body (3) of a heat exchanger through pipe utilized by a heat exchanger production apparatus, which is also connectable at an exterior of a tube-enlarging mandrel (2), for moving back and forth, along said tube-enlarging mandrel (2) which is penetrable from an opening (7b) of a hairpin tube (7) inserted into a heat radiating fin (6) of the heat exchanger (5); and is also equipped with a plurality of tube-contacting parts (3f), capable of radially expanding or axially compressing in a cross direction of a longitudinal length of said hairpin tube (7); and is also equipped with slopes (3b) which are formed beforehand and has a predetermined slope, slanting gradually in a widening direction toward the opening (7b) of the hairpin tube, wherein each of the slopes (3b) is formed to a bigger slant by curve and spread a width of each of multiple slits (3a), and formed on an exterior surface of each of said tube-contacting parts (3f); and which also radially expands or axially compresses each of said tube-contacting parts (3f), by a sliding means which moves back and forth in a longitudinal direction of the hairpin tube, along said slopes (3b) of the tube-contacting parts (3f), said production method comprising:

producing the tube-grasping body (3) having the plurality of tube-contacting parts (3f) with bumps (3e) that protrude into an axial direction of the tube-grasping body (3) which comprises:

a) cutting with a prescribed depth inside the tube-grasping body (3), which has a prescribed total length, at one end positioned at the opening (7b) of the hairpin tube (7) to an other end, forming a swelling part (3z) that bulges to the axial direction of the tube-grasping body (3) to form a smaller inner diameter;

b) after forming the swelling part (3z), forming the multiple slits (3a) of a prescribed width (3u) in the longitudinal direction with a prescribed length and width from one end of the tube-grasping body (3) to the other end of the tube-grasping body (3) in order to form the tube-contacting part (3f) that can freely compress and expand radially in the longitudinal direction of hairpin tube (7) of tube-grasping body (3) and therefore, through the multiple slits (3a), divide the swelling part (3z) by a number of the multiple slits (3a) and forming the plurality of tube-contacting parts (3f) having the bumps (3e) that protrude into the axial direction of the tube-grasping body (3); and c) spreading the multiple slits (3a) from a prescribed point towards the direction of the opening (7b) of the hairpin tube (7) so as to have an expanded width (3x) gradually curved wider than the prescribed width (3u) to form a degree of inclination of each of the slopes (3b) provided on the exterior surface of each tube-contacting part (3f), which inclines in an expanding direction towards the opening (7b) of the hairpin tube (7), larger than a degree of inclination of each of the slopes (3b) when the slits (3a) were formed.

2. The production method for the tube-grasping body of the heat exchanger through pipe according to claim 1, wherein each of the slopes (3b), which inclines in the direction extending towards the opening (7b) of the hairpin tube (7), is formed by cutting or grinding the exterior of the tube-grasping body (3) before forming the multiple slits (3a) of the prescribed width (3u).

3. The production method for the tube-grasping body of the heat exchanger through pipe according to claim 1, wherein the step of spreading the multiple slits (3a) from the prescribed point towards the direction of the opening (7b) of the hairpin tube (7) so as to have an expanded width (3x) that is gradually curved wider than the prescribed width (3u) to form the degree of inclination of each of the slopes (3b) provided on the exterior surface of each tube-contacting part (3f), which inclines in the direction extending towards the opening (7b) of the hairpin tube (7), larger than the degree of inclination of slope (3b) when the multiple slits (3a) were formed, is performed by inserting a cone-liked jig or a cylindrical jig equipped with a plurality of acute convex-like bumps to be inserted in the longitudinal direction from one end of the tube-grasping body (3) to the other end into the multiple slits (3a) from the prescribed point towards the direction of the opening (7b) of the hairpin tube (7).

4. A production method for a tube-grasping body (3) of a heat exchanger through pipe utilized by a heat exchanger production apparatus, which is also connectable at an exterior of a tube-enlarging mandrel (2), for moving back and forth, along said tube-enlarging mandrel (2) which is penetrable from an opening (7b) of a tube (7) inserted into a heat radiating fin (6) of the heat exchanger (5); and is also equipped with a plurality of tube-contacting parts (3f), capable of radially expanding or axially compressing in a cross direction of a longitudinal length of said tube (7); and is also equipped with slopes (3b) which are formed beforehand and has a predetermined slope, slanting gradually in a widening direction toward the opening (7b) of the tube, wherein each of the slopes (3b) is formed to a bigger slant by curve and spread a width of each of multiple slits, and formed on an exterior surface of each of said tube-contacting parts (3f); and which also radially expands or axially compresses each of said tube-contacting parts (3f), by a sliding means which moves back and forth in a longitudinal direction of the tube, along said slopes (3b) of the tube-contacting parts (3f), comprising:

producing the tube-grasping body (3) having the plurality of tube-contacting parts (3f) with bumps (3e) that protrude into an axial direction of the tube-grasping body (3) which comprises:

a) cutting with a prescribed depth inside the tube-grasping body (3), which has a prescribed total length, at one end positioned at the opening (7b) of the tube (7) to an other end, forming a swelling part (3z) that bulges to the axial direction of the tube-grasping body (3) to form a smaller inner diameter;

b) before and after forming the swelling part (3z), grinding or cutting to form a peripheral slope (3m) of an end-line (3o) of one end of tube-grasping body (3) that slopes in a direction extending towards the opening (7b) of the corresponding tube (7);

c) forming the multiple slits (3a) of a prescribed width (3u) in a longitudinal direction with a prescribed length and width from one end of the tube-grasping body (3) to the other end of the tube-grasping body (3) in order to form the tube-contacting part (3f) that can freely compress and expand radially in the longitudinal direction of tube (7) of tube-grasping body (3) and therefore, through the multiple slits (3a), divide the swelling part (3z) by a number of the multiple slits (3a) and forming the plurality of tube-contacting parts (3f) having the bumps (3e) that protrude into the axial direction of the tube-grasping body (3); and d) spreading the multiple slits (3a) from a prescribed point towards the direction of the opening (7b) of the tube (7) so as to have an expanded width (3x) that is gradually curved wider than the prescribed width (3u) to form a degree of inclination of each of the slopes (3b) provided on the exterior surface of each tube-contacting part (3f), which inclines in an expanding direction towards the opening (7b) of the tube (7), larger than a degree of inclination of each of the slopes (3b) when the slits (3a) were formed.

* * * * *